(12) United States Patent
Zhang et al.

(10) Patent No.: US 12,546,976 B2
(45) Date of Patent: Feb. 10, 2026

(54) OPTICAL IMAGING LENS

(71) Applicant: GENIUS ELECTRONIC OPTICAL (XIAMEN) CO., LTD., Fujian (CN)

(72) Inventors: Jiayuan Zhang, Fujian (CN); Huabin Liao, Fujian (CN); Hai Lin, Fujian (CN); Hung-Chien Hsieh, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 766 days.

(21) Appl. No.: 17/835,982

(22) Filed: Jun. 9, 2022

(65) Prior Publication Data
US 2023/0204921 A1 Jun. 29, 2023

(30) Foreign Application Priority Data

Dec. 28, 2021 (CN) .......................... 202111626281.8

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC ..... G02B 13/002; G02B 13/0045; G02B 9/64
See application file for complete search history.

(56) References Cited

U.S. PATENT DOCUMENTS

| | | | |
|---|---|---|---|
| 5,381,270 A | 1/1995 | Cho | |
| 12,181,640 B2* | 12/2024 | Sun | G02B 13/0045 |
| 2019/0121098 A1* | 4/2019 | Zhou | G02B 13/0045 |
| 2020/0201002 A1* | 6/2020 | Xu | G02B 13/06 |
| 2020/0209554 A1* | 7/2020 | Ko | G02B 13/0045 |
| 2021/0018728 A1* | 1/2021 | Li | G02B 27/0025 |
| 2021/0018729 A1* | 1/2021 | Li | G02B 13/0045 |
| 2021/0103129 A1* | 4/2021 | Ji | G02B 13/0045 |
| 2021/0109323 A1* | 4/2021 | Dai | G02B 13/0045 |
| 2021/0132336 A1* | 5/2021 | Chen | G02B 13/18 |

(Continued)

FOREIGN PATENT DOCUMENTS

| | | |
|---|---|---|
| CN | 110989135 | 4/2020 |
| CN | 111948789 | 11/2020 |

(Continued)

OTHER PUBLICATIONS

"Office Action of China Counterpart Application", issued on Mar. 21, 2024, p. 1-p. 15.

*Primary Examiner* — Bumsuk Won
*Assistant Examiner* — Alex Park Rickel
(74) *Attorney, Agent, or Firm* — JCIPRNET

(57) ABSTRACT

An optical imaging lens, including a first lens element, a second lens element, a third lens element, a fourth lens element, a fifth lens element, a sixth lens element, a seventh lens element, and an eighth lens element disposed in sequence from an object side to an image side along an optical axis. The first lens element has positive refracting power, and an optical axis region of the image side of the first lens element is concave. A periphery region of the object side of the second lens element is convex. A periphery region of the image side of the third lens element is convex. An optical axis region of the image side of the fifth lens element is convex. The sixth lens element has negative refracting power. A periphery region of the object side of the eighth lens element is convex.

20 Claims, 22 Drawing Sheets

(56) References Cited

U.S. PATENT DOCUMENTS

| | | | | |
|---|---|---|---|---|
| 2021/0255431 A1* | 8/2021 | Zhang | ............... | G02B 27/0025 |
| 2021/0263285 A1* | 8/2021 | Wang | ............... | G02B 27/0025 |
| 2021/0364752 A1* | 11/2021 | Peng | ...................... | G02B 9/64 |
| 2021/0364754 A1* | 11/2021 | You | .................... | G02B 13/0045 |
| 2022/0099934 A1* | 3/2022 | Meng | ............... | G02B 13/0045 |
| 2022/0113502 A1* | 4/2022 | Sun | .................. | G02B 13/0045 |
| 2022/0113508 A1* | 4/2022 | Shi | ..................... | G02B 13/0045 |
| 2022/0113509 A1* | 4/2022 | Li | ........................... | G02B 9/64 |
| 2022/0137359 A1* | 5/2022 | Fan | ................... | G02B 13/0045 |
| | | | | 359/713 |
| 2022/0155562 A1* | 5/2022 | Zhang | ..................... | G02B 9/64 |
| 2022/0236534 A1* | 7/2022 | Liu | ................... | G02B 15/1461 |
| 2023/0087761 A1* | 3/2023 | Sun | ......................... | G02B 9/64 |
| | | | | 359/708 |
| 2023/0204921 A1* | 6/2023 | Zhang | .................... | G02B 9/64 |
| | | | | 359/708 |

FOREIGN PATENT DOCUMENTS

| | | | |
|---|---|---|---|
| CN | 111965800 | | 11/2020 |
| CN | 112394483 A | * | 2/2021 |
| CN | 112394488 | | 2/2021 |
| CN | 112394491 | | 2/2021 |
| CN | 112630933 | | 4/2021 |
| JP | H06160706 | | 6/1994 |
| JP | 6926308 | | 8/2021 |
| WO | 2021114233 | | 6/2021 |

* cited by examiner

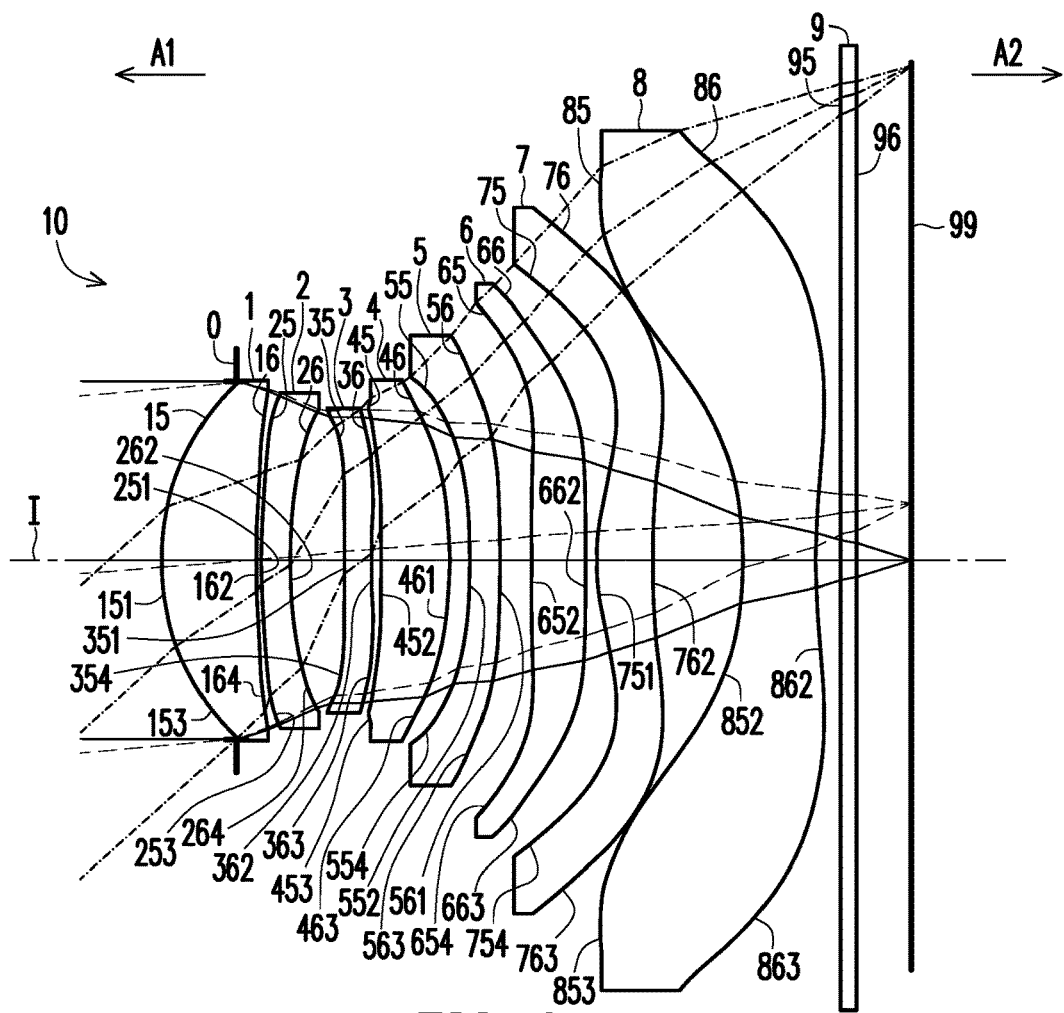
FIG. 6
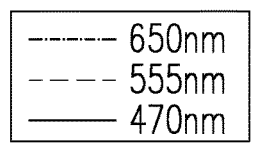
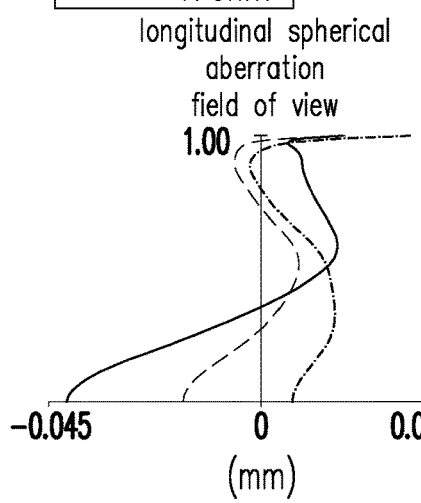
longitudinal spherical aberration
field of view
FIG. 7A
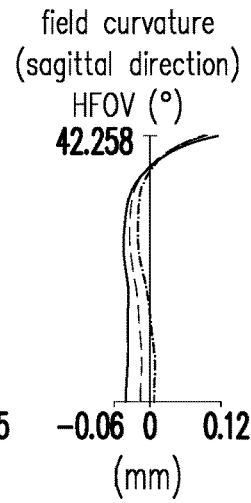
field curvature (sagittal direction) HFOV (°)
FIG. 7B
field curvature (tangential direction) HFOV (°)
FIG. 7C
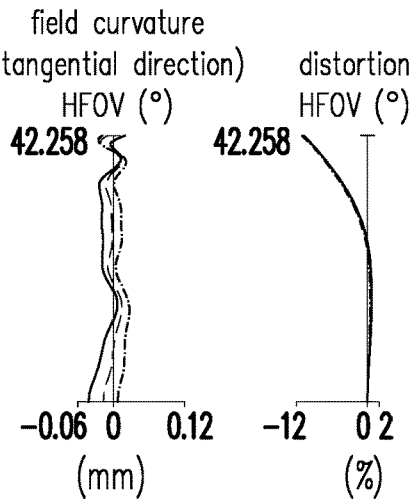
distortion HFOV (°)
FIG. 7D

| First embodiment |||||||
|---|---|---|---|---|---|---|
| EFL= 7.863 mm, HFOV= 42.258°, TTL= 9.675 mm, Fno= 1.700, ImgH= 6.387 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.961 | | | |
| First lens element 1 | Object-side surface 15 | 3.227 | 1.223 | 1.545 | 55.987 | 7.713 |
| | Image-side surface 16 | 11.947 | 0.062 | | | |
| Second lens element 2 | Object-side surface 25 | 9.782 | 0.371 | 1.661 | 20.373 | -24.399 |
| | Image-side surface 26 | 6.017 | 0.700 | | | |
| Third lens element 3 | Object-side surface 35 | 21.446 | 0.359 | 1.651 | 21.514 | -361.512 |
| | Image-side surface 36 | 19.538 | 0.121 | | | |
| Fourth lens element 4 | Object-side surface 45 | -25.271 | 0.883 | 1.545 | 55.987 | 14.591 |
| | Image-side surface 46 | -6.134 | 0.265 | | | |
| Fifth lens element 5 | Object-side surface 55 | -8.318 | 0.385 | 1.671 | 19.243 | -26.347 |
| | Image-side surface 56 | -15.867 | 0.412 | | | |
| Sixth lens element 6 | Object-side surface 65 | -32.474 | 0.688 | 1.567 | 37.533 | -30.469 |
| | Image-side surface 66 | 37.591 | 0.154 | | | |
| Seventh lens element 7 | Object-side surface 75 | 3.474 | 0.718 | 1.567 | 37.533 | 8.060 |
| | Image-side surface 76 | 13.201 | 1.172 | | | |
| Eighth lens element 8 | Object-side surface 85 | -4.892 | 0.935 | 1.535 | 55.690 | -5.688 |
| | Image-side surface 86 | 8.657 | 0.319 | | | |
| Filter 9 | Object-side surface 95 | Infinity | 0.210 | 1.563 | 51.300 | |
| | Image-side surface 96 | Infinity | 0.699 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 2.684493E-01 | -6.051982E-04 | 1.090728E-04 | -1.565781E-04 | 8.287416E-05 |
| 16 | 0.000000E+00 | -1.973733E-02 | 1.266491E-02 | -4.808141E-03 | 1.233300E-03 |
| 25 | 9.677536E+00 | -2.392413E-02 | 1.421787E-02 | -4.912976E-03 | 1.111608E-03 |
| 26 | 3.743595E+00 | -8.419090E-03 | 4.498817E-03 | -8.241753E-04 | -2.174642E-04 |
| 35 | 0.000000E+00 | -1.766316E-02 | -5.023863E-04 | -3.491054E-04 | 1.554893E-04 |
| 36 | 2.708523E+01 | -1.627825E-02 | -2.389843E-03 | 3.872898E-04 | -2.137365E-05 |
| 45 | 4.030705E+01 | -4.982541E-03 | -7.839229E-04 | -1.106005E-03 | 9.669320E-04 |
| 46 | -5.379381E-01 | -3.412747E-03 | -3.935310E-03 | 1.269213E-03 | 6.220865E-05 |
| 55 | 1.116961E+01 | 2.430568E-03 | -8.381570E-03 | 1.797861E-03 | 5.007517E-04 |
| 56 | 2.233371E+01 | 9.226984E-03 | -8.718257E-03 | 9.572101E-04 | 6.536868E-04 |
| 65 | -2.464472E+01 | 1.884348E-02 | -4.771744E-03 | -3.771458E-04 | 2.523138E-04 |
| 66 | 5.840129E+01 | -2.506204E-02 | 9.430818E-03 | -3.000660E-03 | 4.929950E-04 |
| 75 | -1.169222E+01 | 7.062966E-03 | -7.681104E-03 | 2.073941E-03 | -4.927678E-04 |
| 76 | 7.365369E+00 | 1.637719E-02 | -8.697909E-03 | 1.482553E-03 | -1.403383E-04 |
| 85 | -6.085553E-01 | -4.464828E-03 | -1.381976E-03 | 3.756369E-04 | -3.541043E-05 |
| 86 | 9.877738E-01 | -1.021179E-02 | 7.374459E-05 | 1.238806E-04 | -1.861068E-05 |
| Surface | $a_{12}$ | $a_{14}$ | $a_{16}$ | $a_{18}$ | $a_{20}$ |
| 15 | -2.563229E-05 | 4.152141E-06 | -2.989926E-07 | 0.000000E+00 | 0.000000E+00 |
| 16 | -2.071315E-04 | 2.026127E-05 | -8.627469E-07 | 0.000000E+00 | 0.000000E+00 |
| 25 | -1.503669E-04 | 1.003529E-05 | -5.346904E-08 | 0.000000E+00 | 0.000000E+00 |
| 26 | 1.792014E-04 | -4.279077E-05 | 3.934812E-06 | 0.000000E+00 | 0.000000E+00 |
| 35 | -1.046109E-04 | 3.323305E-05 | -3.390027E-06 | 0.000000E+00 | 0.000000E+00 |
| 36 | 2.152744E-05 | 4.037301E-07 | -5.290622E-07 | 0.000000E+00 | 0.000000E+00 |
| 45 | -2.598013E-04 | 3.373962E-05 | -1.759385E-06 | 0.000000E+00 | 0.000000E+00 |
| 46 | -1.121318E-04 | 1.948135E-05 | -8.911692E-07 | 0.000000E+00 | 0.000000E+00 |
| 55 | -2.518947E-04 | 1.838468E-05 | 5.562423E-06 | -1.032016E-06 | 4.963106E-08 |
| 56 | -2.788184E-04 | 4.858807E-05 | -4.287547E-06 | 1.810702E-07 | -2.689744E-09 |
| 65 | -4.025412E-05 | 3.267659E-06 | -1.435527E-07 | 3.235474E-09 | -3.084100E-11 |
| 66 | -4.436879E-05 | 2.305397E-06 | -6.936798E-08 | 1.120147E-09 | -7.769000E-12 |
| 75 | 8.731349E-05 | -9.786304E-06 | 6.451807E-07 | -2.279367E-08 | 3.325430E-10 |
| 76 | 7.509135E-06 | -1.956972E-07 | 7.524300E-11 | 1.182610E-10 | -1.986000E-12 |
| 85 | 1.850678E-06 | -5.902872E-08 | 1.148402E-09 | -1.256500E-11 | 5.900000E-14 |
| 86 | 1.342959E-06 | -5.523038E-08 | 1.307389E-09 | -1.644500E-11 | 8.400000E-14 |

FIG. 9

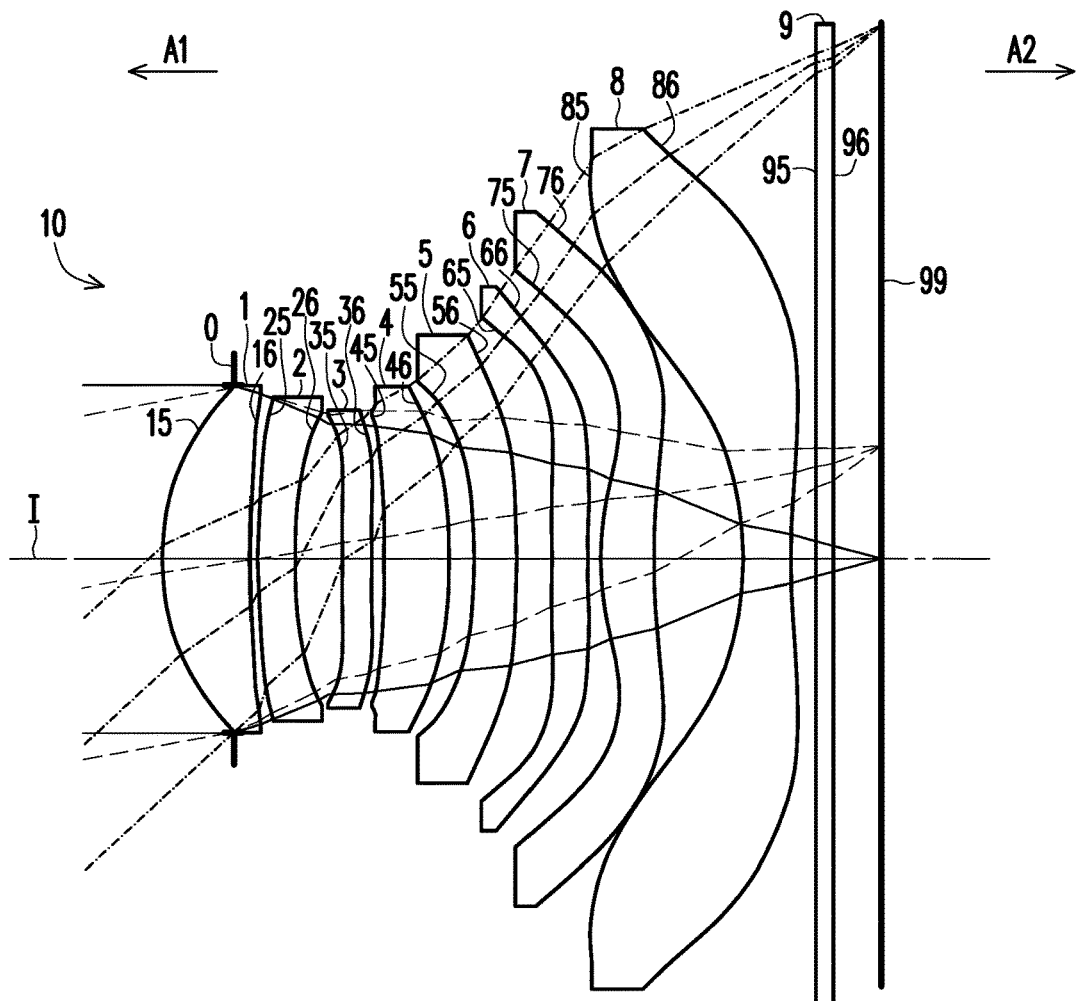
FIG.10
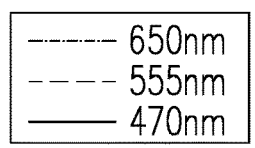
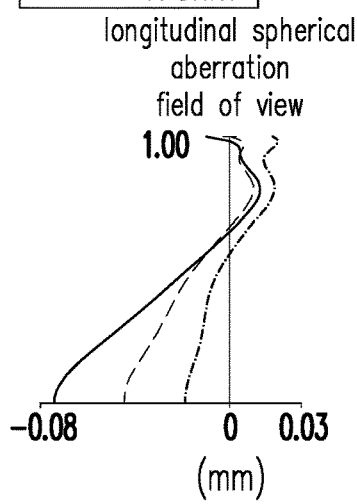
FIG. 11A
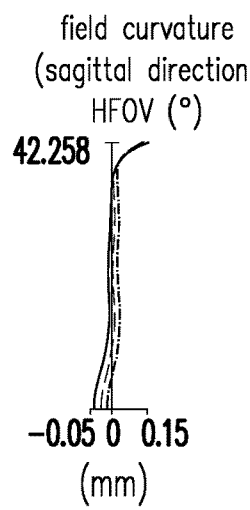
FIG. 11B
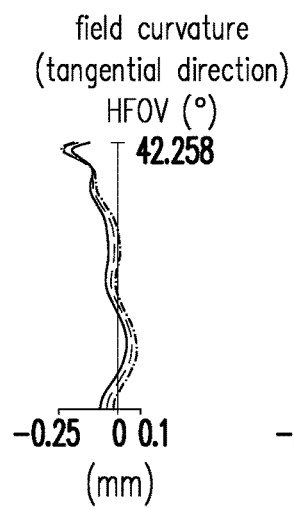
FIG. 11C
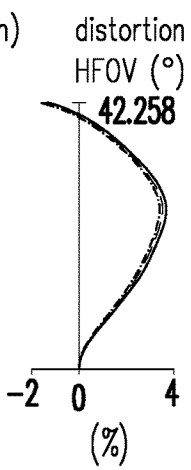
FIG. 11D

| Second embodiment ||||||
|---|---|---|---|---|---|
| EFL= 7.755 mm, HFOV= 42.258°, TTL= 9.518 mm, Fno= 1.700, ImgH= 7.013 mm ||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.961 | | | |
| First lens element 1 | Object-side surface 15 | 3.214 | 1.161 | 1.545 | 55.987 | 7.640 |
| | Image-side surface 16 | 12.191 | 0.102 | | | |
| Second lens element 2 | Object-side surface 25 | 9.905 | 0.496 | 1.661 | 20.373 | -24.571 |
| | Image-side surface 26 | 6.051 | 0.625 | | | |
| Third lens element 3 | Object-side surface 35 | 16.634 | 0.391 | 1.651 | 21.514 | 493.499 |
| | Image-side surface 36 | 17.372 | 0.160 | | | |
| Fourth lens element 4 | Object-side surface 45 | -30.327 | 0.870 | 1.545 | 55.987 | 15.869 |
| | Image-side surface 46 | -6.810 | 0.327 | | | |
| Fifth lens element 5 | Object-side surface 55 | -8.358 | 0.564 | 1.671 | 19.243 | -27.014 |
| | Image-side surface 56 | -15.800 | 0.465 | | | |
| Sixth lens element 6 | Object-side surface 65 | -37.138 | 0.483 | 1.567 | 37.533 | -21.804 |
| | Image-side surface 66 | 18.757 | 0.167 | | | |
| Seventh lens element 7 | Object-side surface 75 | 3.268 | 0.709 | 1.567 | 37.533 | 7.414 |
| | Image-side surface 76 | 13.306 | 1.180 | | | |
| Eighth lens element 8 | Object-side surface 85 | -4.714 | 0.642 | 1.535 | 55.690 | -5.644 |
| | Image-side surface 86 | 8.875 | 0.319 | | | |
| Filter 9 | Object-side surface 95 | Infinity | 0.210 | 1.563 | 51.300 | |
| | Image-side surface 96 | Infinity | 0.647 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 2.602379E-01 | -7.310531E-04 | 1.033794E-04 | -1.573467E-04 | 8.313540E-05 |
| 16 | 0.000000E+00 | -2.004414E-02 | 1.265039E-02 | -4.807598E-03 | 1.233698E-03 |
| 25 | 9.008527E+00 | -2.404668E-02 | 1.413959E-02 | -4.915590E-03 | 1.112970E-03 |
| 26 | 3.583002E+00 | -9.086104E-03 | 4.599185E-03 | -8.050645E-04 | -2.168361E-04 |
| 35 | 0.000000E+00 | -1.811862E-02 | -6.072848E-04 | -3.466743E-04 | 1.598509E-04 |
| 36 | 9.344313E-01 | -1.699781E-02 | -2.502506E-03 | 3.778379E-04 | -2.108731E-05 |
| 45 | 3.532269E+01 | -4.836059E-03 | -7.657384E-04 | -1.103728E-03 | 9.669800E-04 |
| 46 | -1.190861E+00 | -3.079316E-03 | -3.897077E-03 | 1.279815E-03 | 6.193320E-05 |
| 55 | 1.116533E+01 | 2.267479E-03 | -8.509008E-03 | 1.766238E-03 | 4.996660E-04 |
| 56 | 2.198524E+01 | 8.586826E-03 | -8.756044E-03 | 9.580317E-04 | 6.539568E-04 |
| 65 | 3.298331E+00 | 1.899848E-02 | -5.026067E-03 | -3.857990E-04 | 2.514147E-04 |
| 66 | 7.821206E+00 | -2.565039E-02 | 9.312108E-03 | -3.002609E-03 | 4.930393E-04 |
| 75 | -1.162549E+01 | 5.265488E-03 | -7.623245E-03 | 2.074730E-03 | -4.927680E-04 |
| 76 | 7.024721E+00 | 1.598149E-02 | -8.715637E-03 | 1.484171E-03 | -1.402785E-04 |
| 85 | -6.023217E-01 | -4.539125E-03 | -1.381954E-03 | 3.756566E-04 | -3.540974E-05 |
| 86 | 9.885967E-01 | -1.024772E-02 | 7.409296E-05 | 1.239155E-04 | -1.860971E-05 |
| Surface | $a_{12}$ | $a_{14}$ | $a_{16}$ | $a_{18}$ | $a_{20}$ |
| 15 | -2.558458E-05 | 4.154368E-06 | -2.997870E-07 | 0.000000E+00 | 0.000000E+00 |
| 16 | -2.070522E-04 | 2.026200E-05 | -8.694828E-07 | 0.000000E+00 | 0.000000E+00 |
| 25 | -1.501477E-04 | 9.989670E-06 | -8.999132E-08 | 0.000000E+00 | 0.000000E+00 |
| 26 | 1.787583E-04 | -4.293250E-05 | 3.913344E-06 | 0.000000E+00 | 0.000000E+00 |
| 35 | -1.037417E-04 | 3.323023E-05 | -3.452945E-06 | 0.000000E+00 | 0.000000E+00 |
| 36 | 2.180020E-05 | 4.600079E-07 | -5.251935E-07 | 0.000000E+00 | 0.000000E+00 |
| 45 | -2.598438E-04 | 3.372029E-05 | -1.765495E-06 | 0.000000E+00 | 0.000000E+00 |
| 46 | -1.123894E-04 | 1.945151E-05 | -8.887256E-07 | 0.000000E+00 | 0.000000E+00 |
| 55 | -2.513973E-04 | 1.849143E-05 | 5.571025E-06 | -1.033052E-06 | 4.909873E-08 |
| 56 | -2.787850E-04 | 4.859214E-05 | -4.287056E-06 | 1.811219E-07 | -2.685732E-09 |
| 65 | -4.029859E-05 | 3.268985E-06 | -1.431050E-07 | 3.284648E-09 | -2.724700E-11 |
| 66 | -4.436244E-05 | 2.305986E-06 | -6.931446E-08 | 1.124884E-09 | -7.369000E-12 |
| 75 | 8.731385E-05 | -9.786232E-06 | 6.451877E-07 | -2.279310E-08 | 3.325850E-10 |
| 76 | 7.510511E-06 | -1.956857E-07 | 7.388900E-11 | 1.181280E-10 | -1.995000E-12 |
| 85 | 1.850695E-06 | -5.902848E-08 | 1.148399E-09 | -1.256600E-11 | 5.900000E-14 |
| 86 | 1.342977E-06 | -5.523021E-08 | 1.307384E-09 | -1.644500E-11 | 8.400000E-14 |

FIG. 13

| Third embodiment | | | | | | |
|---|---|---|---|---|---|---|
| EFL= 5.745 mm, HFOV= 42.258°, TTL= 7.794 mm, Fno= 1.700, ImgH= 5.173 mm | | | | | | |
| Element | Surface | Radius of curvature (mm) | Gap (mm) | Refractive index | Abbe number | Focal length (mm) |
| Object | | Infinity | Infinity | | | |
| Aperture 0 | | Infinity | -0.502 | | | |
| First lens element 1 | Object-side surface 15 | 2.971 | 1.037 | 1.545 | 55.987 | 7.642 |
| | Image-side surface 16 | 9.030 | 0.031 | | | |
| Second lens element 2 | Object-side surface 25 | 8.249 | 0.193 | 1.661 | 20.373 | 1279.108 |
| | Image-side surface 26 | 8.251 | 0.684 | | | |
| Third lens element 3 | Object-side surface 35 | 30.094 | 0.257 | 1.545 | 55.987 | -9222.042 |
| | Image-side surface 36 | 29.825 | 0.033 | | | |
| Fourth lens element 4 | Object-side surface 45 | -28.518 | 0.793 | 1.545 | 55.987 | 16.456 |
| | Image-side surface 46 | -6.902 | 0.203 | | | |
| Fifth lens element 5 | Object-side surface 55 | -7.004 | 0.604 | 1.640 | 23.529 | -25.494 |
| | Image-side surface 56 | -12.621 | 0.423 | | | |
| Sixth lens element 6 | Object-side surface 65 | -13.681 | 0.301 | 1.567 | 37.533 | -27.640 |
| | Image-side surface 66 | -105.037 | 0.175 | | | |
| Seventh lens element 7 | Object-side surface 75 | 3.519 | 0.813 | 1.567 | 37.533 | 7.617 |
| | Image-side surface 76 | 17.046 | 1.449 | | | |
| Eighth lens element 8 | Object-side surface 85 | -4.467 | 0.351 | 1.535 | 55.690 | -5.469 |
| | Image-side surface 86 | 8.790 | 0.219 | | | |
| Filter 9 | Object-side surface 95 | Infinity | 0.210 | 1.563 | 51.300 | |
| | Image-side surface 96 | Infinity | 0.018 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 2.860277E-01 | -3.126532E-04 | 1.883755E-04 | -1.334962E-04 | 9.451229E-05 |
| 16 | 0.000000E+00 | -2.039695E-02 | 1.237979E-02 | -4.994791E-03 | 1.195770E-03 |
| 25 | 2.479155E+00 | -2.687302E-02 | 1.385638E-02 | -4.979526E-03 | 1.100586E-03 |
| 26 | 3.288423E+00 | -9.285158E-03 | 4.334728E-03 | -7.180383E-04 | -1.895400E-04 |
| 35 | 0.000000E+00 | -2.484805E-02 | -1.399346E-03 | -4.187225E-04 | 1.373946E-04 |
| 36 | -1.653126E+02 | -1.977758E-02 | -3.452493E-03 | 2.169241E-04 | -2.911954E-05 |
| 45 | 6.059785E+01 | 3.050000E-04 | -6.699065E-04 | -1.140998E-03 | 9.438394E-04 |
| 46 | -4.403630E+00 | -5.861931E-03 | -4.369007E-03 | 1.088679E-03 | 4.441426E-05 |
| 55 | 1.105364E+01 | -3.124784E-03 | -8.776397E-03 | 1.705829E-03 | 4.812432E-04 |
| 56 | 2.475665E+01 | 1.002109E-02 | -8.413346E-03 | 9.656333E-04 | 6.526100E-04 |
| 65 | -2.334322E+02 | 2.148091E-02 | -4.911068E-03 | -3.303956E-04 | 2.447707E-04 |
| 66 | 1.125342E+03 | -2.001971E-02 | 9.369544E-03 | -3.001927E-03 | 4.941261E-04 |
| 75 | -1.390210E+01 | 3.686751E-03 | -7.185565E-03 | 2.090952E-03 | -4.929997E-04 |
| 76 | -1.357209E+02 | 1.825215E-02 | -8.601335E-03 | 1.472833E-03 | -1.410356E-04 |
| 85 | -7.113357E-01 | -2.359547E-03 | -1.381081E-03 | 3.747784E-04 | -3.543049E-05 |
| 86 | 1.221172E+00 | -7.945387E-03 | 7.695009E-05 | 1.242077E-04 | -1.864616E-05 |
| Surface | $a_{12}$ | $a_{14}$ | $a_{16}$ | $a_{18}$ | $a_{20}$ |
| 15 | -2.393738E-05 | 4.053354E-06 | -7.000492E-07 | 0.000000E+00 | 0.000000E+00 |
| 16 | -2.102934E-04 | 1.915862E-05 | -1.327426E-06 | 0.000000E+00 | 0.000000E+00 |
| 25 | -1.501512E-04 | 1.034011E-05 | -2.526236E-07 | 0.000000E+00 | 0.000000E+00 |
| 26 | 1.929266E-04 | -4.189201E-05 | 3.914011E-06 | 0.000000E+00 | 0.000000E+00 |
| 35 | -1.124078E-04 | 3.338579E-05 | -2.576455E-06 | 0.000000E+00 | 0.000000E+00 |
| 36 | 2.335963E-05 | 2.089252E-06 | -5.314371E-07 | 0.000000E+00 | 0.000000E+00 |
| 45 | -2.626964E-04 | 3.454695E-05 | -1.140547E-06 | 0.000000E+00 | 0.000000E+00 |
| 46 | -1.133683E-04 | 1.948437E-05 | -1.029823E-06 | 0.000000E+00 | 0.000000E+00 |
| 55 | -2.556285E-04 | 1.786676E-05 | 5.601033E-06 | -1.000632E-06 | 4.950580E-08 |
| 56 | -2.781239E-04 | 4.877928E-05 | -4.262526E-06 | 1.822644E-07 | -2.243312E-09 |
| 65 | -4.117809E-05 | 3.227993E-06 | -1.412278E-07 | 4.010157E-09 | 3.208100E-11 |
| 66 | -4.426492E-05 | 2.313436E-06 | -6.982230E-08 | 7.993650E-10 | -4.990000E-11 |
| 75 | 8.732027E-05 | -9.781793E-06 | 6.446255E-07 | -2.278247E-08 | 3.304670E-10 |
| 76 | 7.529603E-06 | -1.898925E-07 | 3.430150E-10 | 1.145500E-10 | -3.460000E-12 |
| 85 | 1.850767E-06 | -5.901035E-08 | 1.148653E-09 | -1.256100E-11 | 5.900000E-14 |
| 86 | 1.342787E-06 | -5.523315E-08 | 1.307972E-09 | -1.646700E-11 | 8.400000E-14 |

FIG. 17

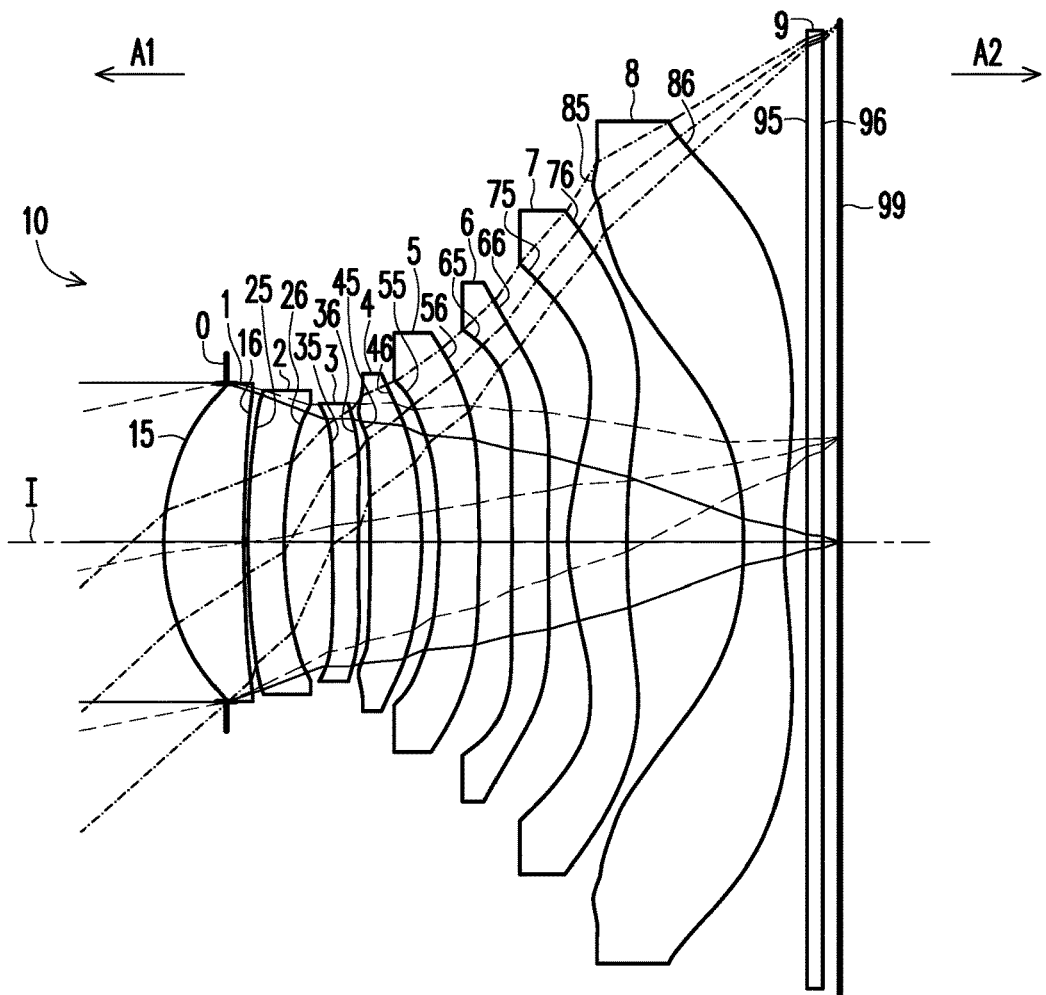
FIG. 18
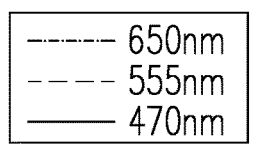
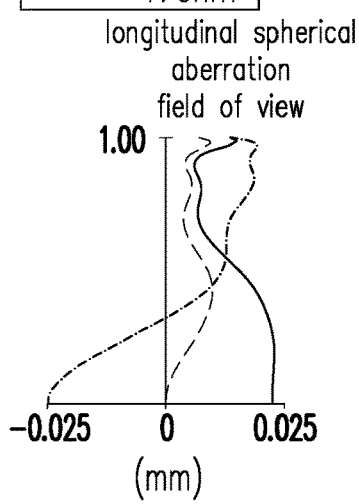
FIG. 19A
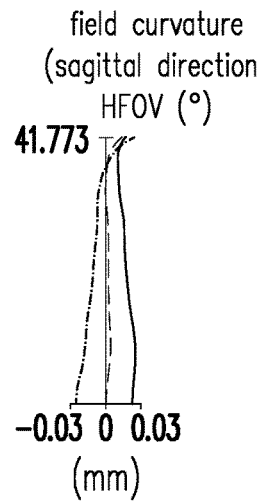
FIG. 19B
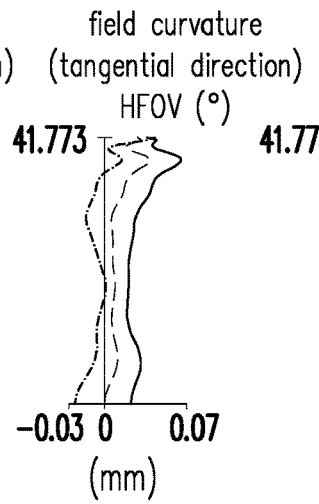
FIG. 19C
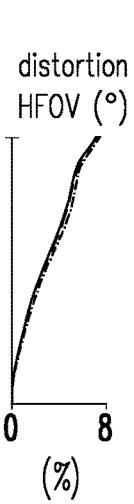
FIG. 19D

| Fourth embodiment |||||||
|---|---|---|---|---|---|---|
| EFL= 7.466 mm, HFOV= 41.773°, TTL= 9.316 mm, Fno= 1.700, ImgH= 7.153 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.867 | | | |
| First lens element 1 | Object-side surface 15 | 3.229 | 1.100 | 1.545 | 55.987 | 7.584 |
| | Image-side surface 16 | 12.870 | 0.055 | | | |
| Second lens element 2 | Object-side surface 25 | 9.544 | 0.507 | 1.661 | 20.373 | -24.944 |
| | Image-side surface 26 | 5.936 | 0.664 | | | |
| Third lens element 3 | Object-side surface 35 | 17.215 | 0.354 | 1.651 | 21.514 | 1053.327 |
| | Image-side surface 36 | 17.510 | 0.177 | | | |
| Fourth lens element 4 | Object-side surface 45 | -30.850 | 0.698 | 1.545 | 55.987 | 15.843 |
| | Image-side surface 46 | -6.813 | 0.241 | | | |
| Fifth lens element 5 | Object-side surface 55 | -8.324 | 0.556 | 1.671 | 19.243 | -26.271 |
| | Image-side surface 56 | -16.060 | 0.443 | | | |
| Sixth lens element 6 | Object-side surface 65 | -33.768 | 0.499 | 1.567 | 37.490 | -19.031 |
| | Image-side surface 66 | 16.066 | 0.277 | | | |
| Seventh lens element 7 | Object-side surface 75 | 3.361 | 0.817 | 1.567 | 37.490 | 7.629 |
| | Image-side surface 76 | 13.489 | 1.612 | | | |
| Eighth lens element 8 | Object-side surface 85 | -4.706 | 0.552 | 1.535 | 55.690 | -5.661 |
| | Image-side surface 86 | 8.919 | 0.319 | | | |
| Filter 9 | Object-side surface 95 | Infinity | 0.210 | 1.563 | 51.300 | |
| | Image-side surface 96 | Infinity | 0.233 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 2.729739E-01 | -3.580207E-04 | -1.046577E-04 | 1.522694E-05 | 1.284239E-05 |
| 16 | 0.000000E+00 | -2.104942E-02 | 1.442587E-02 | -5.947300E-03 | 1.716384E-03 |
| 25 | 9.304848E+00 | -2.336804E-02 | 1.458821E-02 | -5.609478E-03 | 1.524974E-03 |
| 26 | 3.940688E+00 | -6.549977E-03 | 3.741856E-03 | -1.163612E-03 | 2.750831E-04 |
| 35 | 0.000000E+00 | -1.672909E-02 | -1.080960E-03 | -5.472840E-05 | -7.650835E-06 |
| 36 | 1.504148E+01 | -1.647807E-02 | -1.708861E-03 | -2.571234E-04 | 2.774619E-04 |
| 45 | 1.054277E+01 | -5.673480E-03 | 9.759426E-04 | -2.326696E-03 | 1.444055E-03 |
| 46 | -4.661511E-02 | -3.777550E-03 | -3.246008E-03 | 2.790096E-04 | 6.499151E-04 |
| 55 | 1.117715E+01 | 2.989750E-03 | -9.068286E-03 | 1.619705E-03 | 9.951043E-04 |
| 56 | 2.495530E+01 | 1.262894E-02 | -1.066794E-02 | 1.970371E-03 | 2.938387E-04 |
| 65 | 2.829052E+01 | 1.856142E-02 | -5.121371E-03 | -4.979031E-04 | 4.229117E-04 |
| 66 | 6.681940E+00 | -2.528212E-02 | 9.565057E-03 | -3.465418E-03 | 7.698969E-04 |
| 75 | -8.591603E+00 | 8.088092E-04 | -2.481738E-03 | 1.505556E-04 | 2.658972E-06 |
| 76 | 6.949904E+00 | 1.166675E-02 | -5.233948E-03 | 6.005488E-04 | -1.204402E-05 |
| 85 | -5.963278E-01 | -5.955242E-03 | -6.972261E-04 | 2.369460E-04 | -2.026811E-05 |
| 86 | 1.009172E+00 | -8.704150E-03 | -1.777830E-04 | 1.370243E-04 | -1.685938E-05 |
| Surface | $a_{12}$ | $a_{14}$ | $a_{16}$ | $a_{18}$ | $a_{20}$ |
| 15 | -8.751668E-06 | 1.995417E-06 | -1.987216E-07 | 0.000000E+00 | 0.000000E+00 |
| 16 | -3.379384E-04 | 3.968250E-05 | -2.038042E-06 | 0.000000E+00 | 0.000000E+00 |
| 25 | -2.878137E-04 | 3.372427E-05 | -1.689474E-06 | 0.000000E+00 | 0.000000E+00 |
| 26 | -3.779283E-05 | 4.933957E-07 | 7.001953E-07 | 0.000000E+00 | 0.000000E+00 |
| 35 | -4.188513E-05 | 1.915384E-05 | -1.797968E-06 | 0.000000E+00 | 0.000000E+00 |
| 36 | -6.493902E-05 | 1.345946E-05 | -1.181956E-06 | 0.000000E+00 | 0.000000E+00 |
| 45 | -3.598895E-04 | 4.324223E-05 | -2.035036E-06 | 0.000000E+00 | 0.000000E+00 |
| 46 | -2.660350E-04 | 3.912275E-05 | -1.914744E-06 | 0.000000E+00 | 0.000000E+00 |
| 55 | -5.685614E-04 | 1.283400E-04 | -1.594678E-05 | 1.177450E-06 | -4.347966E-08 |
| 56 | -2.165892E-04 | 4.729095E-05 | -5.453046E-06 | 3.384000E-07 | -8.989129E-09 |
| 65 | -1.023236E-04 | 1.398397E-05 | -1.118610E-06 | 4.643297E-08 | -7.004850E-10 |
| 66 | -1.129101E-04 | 1.108497E-05 | -6.832640E-07 | 2.333830E-08 | -3.313300E-10 |
| 75 | 3.782897E-06 | -1.026172E-06 | 9.754480E-08 | -4.153299E-09 | 6.717600E-11 |
| 76 | -4.024114E-06 | 4.616585E-07 | -2.299183E-08 | 5.696770E-10 | -5.731000E-12 |
| 85 | 8.764353E-07 | -2.087275E-08 | 2.528490E-10 | -9.820000E-13 | -4.000000E-15 |
| 86 | 1.092939E-06 | -4.262369E-08 | 1.000857E-09 | -1.298600E-11 | 7.100000E-14 |

FIG. 21

| Fifth embodiment |||||||
|---|---|---|---|---|---|---|
| EFL= 7.628 mm, HFOV= 43.012°, TTL= 9.520 mm, Fno= 1.700, ImgH= 6.528 mm |||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.918 | | | |
| First lens element 1 | Object-side surface 15 | 3.210 | 1.084 | 1.545 | 55.987 | 8.073 |
| | Image-side surface 16 | 10.392 | 0.267 | | | |
| Second lens element 2 | Object-side surface 25 | 9.774 | 0.262 | 1.661 | 20.373 | -33.683 |
| | Image-side surface 26 | 6.738 | 0.502 | | | |
| Third lens element 3 | Object-side surface 35 | 16.813 | 0.418 | 1.651 | 21.514 | -55.024 |
| | Image-side surface 36 | 11.359 | 0.101 | | | |
| Fourth lens element 4 | Object-side surface 45 | -384.835 | 0.794 | 1.545 | 55.987 | 12.495 |
| | Image-side surface 46 | -6.712 | 0.582 | | | |
| Fifth lens element 5 | Object-side surface 55 | -8.265 | 0.746 | 1.671 | 19.243 | -33.241 |
| | Image-side surface 56 | -13.533 | 0.437 | | | |
| Sixth lens element 6 | Object-side surface 65 | -26.682 | 0.378 | 1.567 | 37.490 | -15.421 |
| | Image-side surface 66 | 13.174 | 0.115 | | | |
| Seventh lens element 7 | Object-side surface 75 | 2.953 | 0.662 | 1.567 | 37.490 | 6.743 |
| | Image-side surface 76 | 11.711 | 1.116 | | | |
| Eighth lens element 8 | Object-side surface 85 | -4.858 | 1.150 | 1.535 | 55.690 | -5.643 |
| | Image-side surface 86 | 8.702 | 0.319 | | | |
| Filter 9 | Object-side surface 95 | Infinity | 0.210 | 1.563 | 51.300 | |
| | Image-side surface 96 | Infinity | 0.376 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 2.649347E-01 | -6.644016E-04 | -1.074005E-04 | 7.093845E-05 | -4.778094E-05 |
| 16 | 0.000000E+00 | -4.181633E-03 | 1.193809E-03 | -4.967651E-04 | 2.401888E-04 |
| 25 | 1.056810E+01 | -1.303193E-02 | 3.867450E-03 | -3.979908E-04 | -2.152482E-05 |
| 26 | 2.513108E+00 | -9.789227E-03 | 3.788788E-03 | -4.004659E-04 | -6.546559E-05 |
| 35 | 0.000000E+00 | -1.559213E-02 | -3.602919E-04 | -1.071116E-03 | 7.337645E-04 |
| 36 | 1.549542E+01 | -1.401287E-02 | -2.504950E-04 | -2.137502E-03 | 1.460942E-03 |
| 45 | -4.870669E+04 | -4.012555E-03 | 1.071070E-03 | -2.633103E-03 | 1.797193E-03 |
| 46 | 9.697756E-01 | -5.853052E-03 | -1.625605E-03 | 1.088723E-03 | -3.511722E-04 |
| 55 | 1.154058E+01 | -2.700112E-03 | -5.159938E-03 | 2.042143E-03 | -3.304372E-04 |
| 56 | 1.620082E+01 | 8.533622E-03 | -9.196163E-03 | 3.056481E-03 | -6.797220E-04 |
| 65 | -1.506489E+03 | 2.139314E-02 | -7.148206E-03 | 1.098026E-03 | -1.482895E-04 |
| 66 | -1.273114E+01 | -3.349333E-02 | 1.380359E-02 | -4.315872E-03 | 8.101097E-04 |
| 75 | -8.454821E+00 | -6.206525E-04 | -2.288039E-03 | -4.753028E-04 | 2.580510E-04 |
| 76 | -4.471071E-01 | 2.455340E-02 | -1.292414E-02 | 2.461668E-03 | -2.723570E-04 |
| 85 | -5.671511E-01 | 2.320891E-03 | -4.656183E-03 | 1.037158E-03 | -1.057234E-04 |
| 86 | 9.143107E-01 | -1.291812E-03 | -1.892792E-03 | 3.529375E-04 | -3.322762E-05 |
| Surface | $a_{12}$ | $a_{14}$ | $a_{16}$ | $a_{18}$ | $a_{20}$ |
| 15 | 1.548345E-05 | -2.632629E-06 | 1.684733E-07 | 0.000000E+00 | 0.000000E+00 |
| 16 | -7.469877E-05 | 1.193353E-05 | -7.298619E-07 | 0.000000E+00 | 0.000000E+00 |
| 25 | -9.684114E-07 | 3.952641E-06 | -3.459651E-07 | 0.000000E+00 | 0.000000E+00 |
| 26 | 2.437295E-05 | -3.851782E-06 | 5.826391E-07 | 0.000000E+00 | 0.000000E+00 |
| 35 | -3.217960E-04 | 6.946477E-05 | -5.346704E-06 | 0.000000E+00 | 0.000000E+00 |
| 36 | -4.690371E-04 | 7.805967E-05 | -5.020175E-06 | 0.000000E+00 | 0.000000E+00 |
| 45 | -5.229547E-04 | 7.250209E-05 | -3.892022E-06 | 0.000000E+00 | 0.000000E+00 |
| 46 | 1.012675E-04 | -1.956808E-05 | 1.471774E-06 | 0.000000E+00 | 0.000000E+00 |
| 55 | -4.973908E-05 | 4.292619E-05 | -1.127693E-05 | 1.426803E-06 | -7.202747E-08 |
| 56 | 1.169754E-04 | -1.546815E-05 | 1.410615E-06 | -7.435432E-08 | 1.646346E-09 |
| 65 | 2.114386E-05 | -2.815534E-06 | 2.563923E-07 | -1.295504E-08 | 2.747180E-10 |
| 66 | -9.091642E-05 | 5.245644E-06 | -4.185150E-08 | -1.028405E-08 | 3.567710E-10 |
| 75 | -4.244062E-05 | 3.323275E-06 | -1.162711E-07 | 7.463790E-10 | 3.262800E-11 |
| 76 | 1.862395E-05 | -8.285137E-07 | 2.585336E-08 | -5.799540E-10 | 7.051000E-12 |
| 85 | 6.280983E-06 | -2.315953E-07 | 5.251827E-09 | -6.748600E-11 | 3.780000E-13 |
| 86 | 1.886131E-06 | -6.683925E-08 | 1.440440E-09 | -1.720600E-11 | 8.700000E-14 |

FIG. 25

| Sixth embodiment ||||||
|---|---|---|---|---|---|---|
| | EFL= 5.610 mm, HFOV= 39.156°, TTL= 8.022 mm, Fno= 1.700, ImgH= 4.800 mm ||||||
| Element | Surface | Radius of curvature (mm) | Gap (mm) | Refractive index | Abbe number | Focal length (mm) |
| Object | | Infinity | Infinity | | | |
| Aperture 0 | | Infinity | -0.489 | | | |
| First lens element 1 | Object-side surface 15 | 2.985 | 0.936 | 1.545 | 55.987 | 7.051 |
| | Image-side surface 16 | 11.794 | 0.098 | | | |
| Second lens element 2 | Object-side surface 25 | 10.196 | 0.405 | 1.661 | 20.373 | -19.098 |
| | Image-side surface 26 | 5.574 | 0.490 | | | |
| Third lens element 3 | Object-side surface 35 | 16.408 | 0.393 | 1.651 | 21.514 | -468.852 |
| | Image-side surface 36 | 15.429 | 0.121 | | | |
| Fourth lens element 4 | Object-side surface 45 | -49.318 | 0.718 | 1.545 | 55.987 | -179.896 |
| | Image-side surface 46 | -99.511 | 0.253 | | | |
| Fifth lens element 5 | Object-side surface 55 | 25.757 | 0.422 | 1.671 | 19.243 | 8.299 |
| | Image-side surface 56 | -7.146 | 0.393 | | | |
| Sixth lens element 6 | Object-side surface 65 | -9.349 | 0.209 | 1.567 | 37.490 | -1000.000 |
| | Image-side surface 66 | -9.582 | 0.263 | | | |
| Seventh lens element 7 | Object-side surface 75 | 8.836 | 0.882 | 1.567 | 37.490 | -827.270 |
| | Image-side surface 76 | 8.359 | 0.948 | | | |
| Eighth lens element 8 | Object-side surface 85 | 67.971 | 0.582 | 1.535 | 55.690 | 466.802 |
| | Image-side surface 86 | 93.007 | 0.619 | | | |
| Filter 9 | Object-side surface 95 | Infinity | 0.210 | 1.563 | 51.300 | |
| | Image-side surface 96 | Infinity | 0.082 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 2.672231E-01 | 1.810461E-03 | -7.502236E-03 | 9.662218E-03 | -6.949813E-03 |
| 16 | 0.000000E+00 | -1.942938E-02 | 1.980728E-02 | -1.778581E-02 | 1.084932E-02 |
| 25 | 7.977339E+00 | -1.847121E-02 | 9.239078E-03 | -1.576775E-03 | -1.266404E-03 |
| 26 | 3.438714E+00 | -1.035641E-02 | 1.195529E-02 | -1.277371E-02 | 9.877352E-03 |
| 35 | 0.000000E+00 | -1.619639E-02 | -1.070630E-02 | 9.686617E-03 | -5.409857E-03 |
| 36 | 1.896853E+01 | -1.663667E-02 | 3.296875E-03 | -7.337499E-03 | 5.222568E-03 |
| 45 | 0.000000E+00 | -7.673554E-03 | 1.489760E-02 | -1.413384E-02 | 7.034641E-03 |
| 46 | 1.601414E+03 | -1.337847E-02 | -5.984937E-03 | 6.916079E-03 | -3.375695E-03 |
| 55 | -2.270815E+03 | 8.964754E-03 | -2.218380E-02 | 1.171160E-02 | -4.630747E-03 |
| 56 | 6.411515E+00 | 1.483198E-02 | -7.133909E-03 | -3.019124E-03 | 3.499277E-03 |
| 65 | -3.227170E+00 | 2.080338E-02 | -8.493214E-03 | 3.593505E-04 | 1.022756E-03 |
| 66 | -1.229030E+02 | -3.252752E-02 | 3.394976E-02 | -2.633654E-02 | 1.279949E-02 |
| 75 | -4.599315E+01 | -2.001788E-02 | 1.976665E-02 | -1.431652E-02 | 5.910505E-03 |
| 76 | 1.875037E+00 | -1.332441E-03 | 5.220030E-03 | -2.874615E-03 | 6.793811E-04 |
| 85 | 0.000000E+00 | 1.376328E-02 | -6.656784E-03 | 9.834248E-04 | -5.374774E-05 |
| 86 | -4.518823E+04 | 5.951029E-02 | -1.969420E-02 | 3.310612E-03 | -3.323466E-04 |
| Surface | $a_{12}$ | $a_{14}$ | $a_{16}$ | $a_{18}$ | $a_{20}$ |
| 15 | 2.840552E-03 | -6.184713E-04 | 5.561678E-05 | 0.000000E+00 | 0.000000E+00 |
| 16 | -3.901802E-03 | 7.335416E-04 | -5.470849E-05 | 0.000000E+00 | 0.000000E+00 |
| 25 | 9.513690E-04 | -2.525685E-04 | 2.429612E-05 | 0.000000E+00 | 0.000000E+00 |
| 26 | -4.635874E-03 | 1.163615E-03 | -1.192547E-04 | 0.000000E+00 | 0.000000E+00 |
| 35 | 1.695362E-03 | -2.792994E-04 | 1.979463E-05 | 0.000000E+00 | 0.000000E+00 |
| 36 | -1.954840E-03 | 3.924729E-04 | -3.228317E-05 | 0.000000E+00 | 0.000000E+00 |
| 45 | -2.079896E-03 | 3.557351E-04 | -2.654251E-05 | 0.000000E+00 | 0.000000E+00 |
| 46 | 8.653143E-04 | -1.149016E-04 | 6.612303E-06 | 0.000000E+00 | 0.000000E+00 |
| 55 | 1.465032E-03 | -3.441795E-04 | 5.351956E-05 | -4.814230E-06 | 1.883941E-07 |
| 56 | -1.377244E-03 | 3.094798E-04 | -4.206658E-05 | 3.175471E-06 | -9.869232E-08 |
| 65 | -5.185636E-04 | 1.169401E-04 | -1.267930E-05 | 5.030785E-07 | 4.125819E-09 |
| 66 | -4.079638E-03 | 8.339928E-04 | -1.041176E-04 | 7.195608E-06 | -2.107412E-07 |
| 75 | -1.622747E-03 | 2.954552E-04 | -3.376147E-05 | 2.175331E-06 | -6.000025E-08 |
| 76 | -9.152105E-05 | 7.484354E-06 | -3.666390E-07 | 9.836377E-09 | -1.099920E-10 |
| 85 | -1.064178E-06 | 2.946782E-07 | -1.579511E-08 | 3.790000E-10 | -3.542000E-12 |
| 86 | 2.042755E-05 | -7.637235E-07 | 1.675563E-08 | -1.959230E-10 | 9.250000E-13 |

FIG. 29

| Parameter | First embodiment | Second embodiment | Third embodiment | Fourth embodiment | Fifth embodiment | Sixth embodiment |
|---|---|---|---|---|---|---|
| T1 | 1.223 | 1.161 | 1.037 | 1.100 | 1.084 | 0.936 |
| G12 | 0.062 | 0.102 | 0.031 | 0.055 | 0.267 | 0.098 |
| T2 | 0.371 | 0.496 | 0.193 | 0.507 | 0.262 | 0.405 |
| G23 | 0.700 | 0.625 | 0.684 | 0.664 | 0.502 | 0.490 |
| T3 | 0.359 | 0.391 | 0.257 | 0.354 | 0.418 | 0.393 |
| G34 | 0.121 | 0.160 | 0.033 | 0.177 | 0.101 | 0.121 |
| T4 | 0.883 | 0.870 | 0.793 | 0.698 | 0.794 | 0.718 |
| G45 | 0.265 | 0.327 | 0.203 | 0.241 | 0.582 | 0.253 |
| T5 | 0.385 | 0.564 | 0.604 | 0.556 | 0.746 | 0.422 |
| G56 | 0.412 | 0.465 | 0.423 | 0.443 | 0.437 | 0.393 |
| T6 | 0.688 | 0.483 | 0.301 | 0.499 | 0.378 | 0.209 |
| G67 | 0.154 | 0.167 | 0.175 | 0.277 | 0.115 | 0.263 |
| T7 | 0.718 | 0.709 | 0.813 | 0.817 | 0.662 | 0.882 |
| G78 | 1.172 | 1.180 | 1.449 | 1.612 | 1.116 | 0.948 |
| T8 | 0.935 | 0.642 | 0.351 | 0.552 | 1.150 | 0.582 |
| G8F | 0.319 | 0.319 | 0.219 | 0.319 | 0.319 | 0.619 |
| TF | 0.210 | 0.210 | 0.210 | 0.210 | 0.210 | 0.210 |
| GFP | 0.699 | 0.647 | 0.018 | 0.233 | 0.376 | 0.082 |
| BFL | 1.228 | 1.176 | 0.447 | 0.762 | 0.905 | 0.911 |
| EFL | 7.863 | 7.755 | 5.745 | 7.466 | 7.628 | 5.610 |
| TL | 8.446 | 8.342 | 7.347 | 8.553 | 8.614 | 7.111 |
| TTL | 9.675 | 9.518 | 7.794 | 9.316 | 9.520 | 8.022 |
| ALT | 5.561 | 5.316 | 4.349 | 5.083 | 5.494 | 4.546 |
| AAG | 2.886 | 3.026 | 2.998 | 3.470 | 3.121 | 2.565 |
| Tmax | 1.223 | 1.161 | 1.037 | 1.100 | 1.150 | 0.936 |
| Tmin | 0.359 | 0.391 | 0.193 | 0.354 | 0.262 | 0.209 |
| V1 | 55.987 | 55.987 | 55.987 | 55.987 | 55.987 | 55.987 |
| V2 | 20.373 | 20.373 | 20.373 | 20.373 | 20.373 | 20.373 |
| V3 | 21.514 | 21.514 | 55.987 | 21.514 | 21.514 | 21.514 |
| V4 | 55.987 | 55.987 | 55.987 | 55.987 | 55.987 | 55.987 |
| V5 | 19.243 | 19.243 | 23.529 | 19.243 | 19.243 | 19.243 |
| V6 | 37.533 | 37.533 | 37.533 | 0.000 | 37.490 | 37.490 |
| V7 | 37.533 | 37.533 | 37.533 | 37.490 | 37.490 | 37.490 |
| V8 | 55.690 | 55.690 | 55.690 | 55.690 | 55.690 | 55.690 |
| HFOV | 42.258 | 42.258 | 42.258 | 41.773 | 43.012 | 39.156 |
| Fno | 1.700 | 1.700 | 1.700 | 1.700 | 1.700 | 1.700 |
| ImgH | 6.387 | 7.013 | 5.173 | 7.153 | 6.528 | 4.800 |

FIG. 30

| Condition | First embodiment | Second embodiment | Third embodiment | Fourth embodiment | Fifth embodiment | Sixth embodiment |
|---|---|---|---|---|---|---|
| V3+V5+V7 | 78.289 | 78.289 | 117.049 | 78.246 | 78.246 | 78.246 |
| (T2+T5)/T3 | 2.106 | 2.709 | 3.108 | 2.999 | 2.415 | 2.106 |
| TL/(G67+G78) | 6.370 | 6.191 | 4.524 | 4.527 | 6.997 | 5.872 |
| ImgH/(BFL+Tmax) | 2.606 | 3.001 | 3.486 | 3.841 | 3.177 | 2.600 |
| ALT/(G56+T7) | 4.921 | 4.528 | 3.518 | 4.034 | 4.999 | 3.566 |
| AAG/(T1+T8) | 1.337 | 1.678 | 2.160 | 2.100 | 1.397 | 1.691 |
| (T4+G45+T5+T8)/BFL | 2.008 | 2.042 | 4.365 | 2.686 | 3.615 | 2.168 |
| (T1+T7)/T4 | 2.199 | 2.149 | 2.333 | 2.744 | 2.200 | 2.530 |
| TL/(G12+BFL) | 6.546 | 6.527 | 15.376 | 10.463 | 7.349 | 7.048 |
| (EFL+ImgH)/(Tmax+Tmin) | 9.009 | 9.516 | 8.873 | 10.054 | 10.024 | 9.098 |
| ALT/(G45+G67+G78) | 3.496 | 3.176 | 2.381 | 2.386 | 3.029 | 3.105 |
| AAG/(T2+T6+T7) | 1.624 | 1.793 | 2.293 | 1.904 | 2.397 | 1.715 |
| TTL/(T1+G23) | 5.031 | 5.330 | 4.528 | 5.280 | 6.000 | 5.627 |
| (G78+T8)/(G12+T2) | 4.863 | 3.051 | 8.024 | 3.853 | 4.282 | 3.040 |
| TL/(G45+G56) | 12.488 | 10.539 | 11.739 | 12.500 | 8.450 | 11.015 |
| (TTL+Tmin)/Tmax | 8.204 | 8.536 | 7.702 | 8.792 | 8.506 | 8.797 |
| BFL/(G23+G34) | 1.496 | 1.498 | 0.623 | 0.906 | 1.501 | 1.491 |
| EFL/(T3+T6) | 7.511 | 8.870 | 10.307 | 8.747 | 9.588 | 9.330 |

FIG. 31

OPTICAL IMAGING LENS

CROSS-REFERENCE TO RELATED APPLICATION

This application claims the priority benefit of China application serial no. 202111626281.8, filed on Dec. 28, 2021. The entirety of the above-mentioned patent application is hereby incorporated by reference herein and made a part of this specification.

BACKGROUND

Technology Field

The disclosure relates to an optical element, and particularly, to an optical imaging lens.

Description of Related Art

In recent years, optical imaging lenses have evolved continuously, and the scope of their applications has broadened. In addition to the requirement of light, thin, short, and small lenses, a small F-number (Fno) design contributes to the increase of the luminous flux, and a large field of view has gradually become a trend. Moreover, to improve the pixel and resolution, the image height of the lens must be increased, and a larger image sensor is configured to receive the imaging ray to meet the demand for high pixel. Therefore, how to design a light, thin, short, and small optical imaging lens with a small F-number (Fno), a large image height, and good imaging quality has become a challenging problem to be solved.

SUMMARY

The disclosure provides an optical imaging lens, which can provide a lens with a smaller F-number (Fno), a larger image height, improved chromatic aberration, and favorable imaging quality. The optical imaging lens can be used to shoot images and videos and applied to portable electronic products, such as mobile phones, cameras, tablets, personal digital assistants (PDAs) or head-mounted displays (e.g., augmented reality (AR) displays, virtual reality (VR) displays, or mixed reality (MR) displays, and the like).

An optical imaging lens includes a first lens element, a second lens element, a third lens element, a fourth lens element, a fifth lens element, a sixth lens element, a seventh lens element, and an eighth lens element in sequence along an optical axis from an object side to an image side. In addition, the first lens element to the eighth lens element each include an object-side surface facing the object side and allowing imaging rays to pass through and an image-side surface facing the image side and allowing the imaging rays to pass through. The first lens element has positive refracting power and an optical axis region of the image-side surface of the first lens element is concave. A periphery region of the object-side surface of the second lens element is convex. A periphery region of the image-side surface of the third lens element is convex. An optical axis region of the image-side surface of the fifth lens element is convex. The sixth lens element has negative refracting power. A periphery region of the object-side surface of the eighth lens element is convex. The optical imaging lens has only the eight lens elements, and the optical imaging lens satisfies the following condition: $V3+V5+V7 \leq 120.000$. V3 is an Abbe number of the third lens element, V5 is an Abbe number of the fifth lens element, and V7 is an Abbe number of the seventh lens element.

An optical imaging lens includes a first lens element, a second lens element, a third lens element, a fourth lens element, a fifth lens element, a sixth lens element, a seventh lens element, and an eighth lens element in sequence along an optical axis from an object side to an image side. In addition, the first lens element to the eighth lens element each include an object-side surface facing the object side and allowing imaging rays to pass through and an image-side surface facing the image side and allowing the imaging rays to pass through. The first lens element has positive refracting power and an optical axis region of the image-side surface of the first lens element is concave. A periphery region of the image-side surface of the third lens element is convex. An optical axis region of the image-side surface of the fifth lens element is convex. The sixth lens element has negative refracting power. A periphery region of the object-side surface of the seventh lens element is concave. A periphery region of the object-side surface of the eighth lens element is convex. The optical imaging lens has only the eight lens elements, and the optical imaging lens satisfies the following condition: $V3+V5+V7 \leq 120.000$. V3 is an Abbe number of the third lens element, V5 is an Abbe number of the fifth lens element, and V7 is an Abbe number of the seventh lens element.

An optical imaging lens includes a first lens element, a second lens element, a third lens element, a fourth lens element, a fifth lens element, a sixth lens element, a seventh lens element, and an eighth lens element in sequence along an optical axis from an object side to an image side. In addition, the first lens element to the eighth lens element each include an object-side surface facing the object side and allowing imaging rays to pass through and an image-side surface facing the image side and allowing the imaging rays to pass through. The first lens element has positive refracting power and an optical axis region of the image-side surface of the first lens element is concave. A periphery region of the image-side surface of the third lens element is convex. An optical axis region of the image-side surface of the fifth lens element is convex. The sixth lens element has negative refracting power. A periphery region of the object-side surface of the eighth lens element is convex, and an optical axis region of the image-side surface of the eighth lens element is concave. The optical imaging lens has only the eight lens elements, and the optical imaging lens satisfies the following condition: $V3+V5+V7 \leq 120.000$. V3 is an Abbe number of the third lens element, V5 is an Abbe number of the fifth lens element, and V7 is an Abbe number of the seventh lens element.

In summary, the beneficial effect of the optical imaging lens of the embodiments of the disclosure is that the optical imaging lens of the embodiments of the disclosure satisfies the number of the lens elements, the surface shape design of the lens elements, and the conditions, and a lens with a smaller F-number, a larger image height, improved chromatic aberration, and good image quality may be provided.

In order to make the features and advantages of the disclosure comprehensible, embodiments accompanied with drawings are described in detail below.

BRIEF DESCRIPTION OF THE DRAWINGS

FIG. 6 is a schematic view of the optical imaging lens according to a first embodiment of the disclosure.

FIG. 7A to FIG. 7D are diagrams of longitudinal spherical aberration and various aberrations of the optical imaging lens of the first embodiment.

FIG. 8 illustrates detailed optical data of the optical imaging lens of the first embodiment of the disclosure.

FIG. 9 illustrates the aspheric parameters of the optical imaging lens of the first embodiment of the disclosure.

FIG. 10 is a schematic view of an optical imaging lens according to a second embodiment of the disclosure.

FIG. 11A to FIG. 11D are diagrams of longitudinal spherical aberration and various aberrations of the optical imaging lens of the second embodiment.

FIG. 12 illustrates detailed optical data of the optical imaging lens of the second embodiment of the disclosure.

FIG. 13 illustrates the aspheric parameters of the optical imaging lens of the second embodiment of the disclosure.

FIG. 16 illustrates detailed optical data of the optical imaging lens of the third embodiment of the disclosure.

FIG. 17 illustrates the aspheric parameters of the optical imaging lens of the third embodiment of the disclosure.

FIG. 18 is a schematic view of an optical imaging lens according to a fourth embodiment of the disclosure.

FIG. 19A to FIG. 19D are diagrams of longitudinal spherical aberration and various aberrations of the optical imaging lens of the fourth embodiment.

FIG. 20 illustrates detailed optical data of the optical imaging lens of the fourth embodiment of the disclosure.

FIG. 21 illustrates the aspheric parameters of the optical imaging lens of the fourth embodiment of the disclosure.

FIG. 24 illustrates detailed optical data of the optical imaging lens of the fifth embodiment of the disclosure.

FIG. 25 illustrates the aspheric parameters of the optical imaging lens of the fifth embodiment of the disclosure.

FIG. 28 illustrates detailed optical data of the optical imaging lens of the sixth embodiment of the disclosure.

FIG. 29 illustrates the aspheric parameters of the optical imaging lens of the sixth embodiment of the disclosure.

FIG. 30 to FIG. 31 illustrate the values of important parameters and conditions of the optical imaging lenses of the first embodiment to the sixth embodiment of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
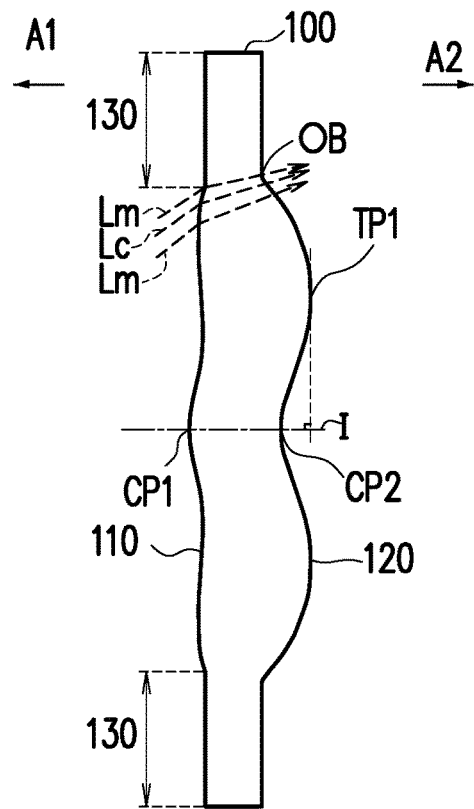
FIG. 1 is a schematic view illustrating the surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
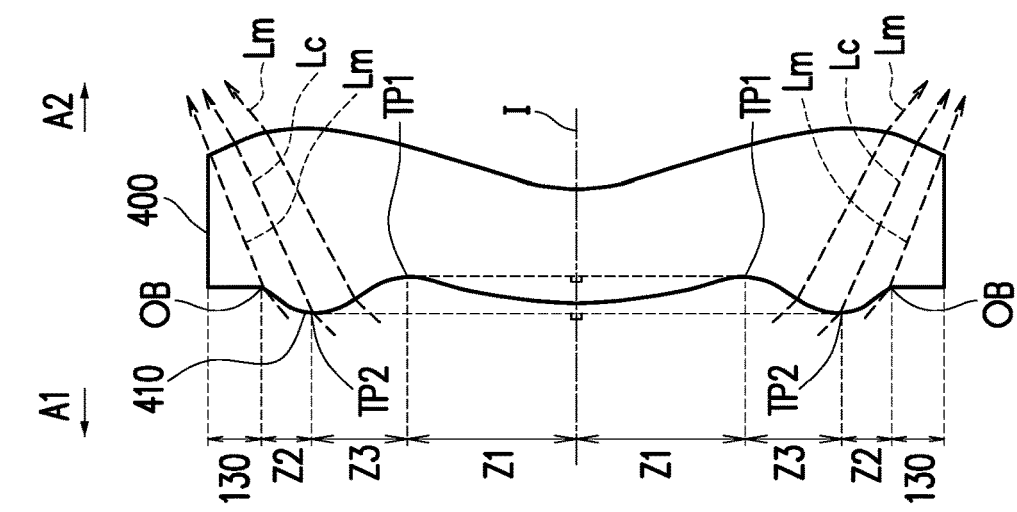
FIG. 4 is a schematic view illustrating the surface structure of a lens element of example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
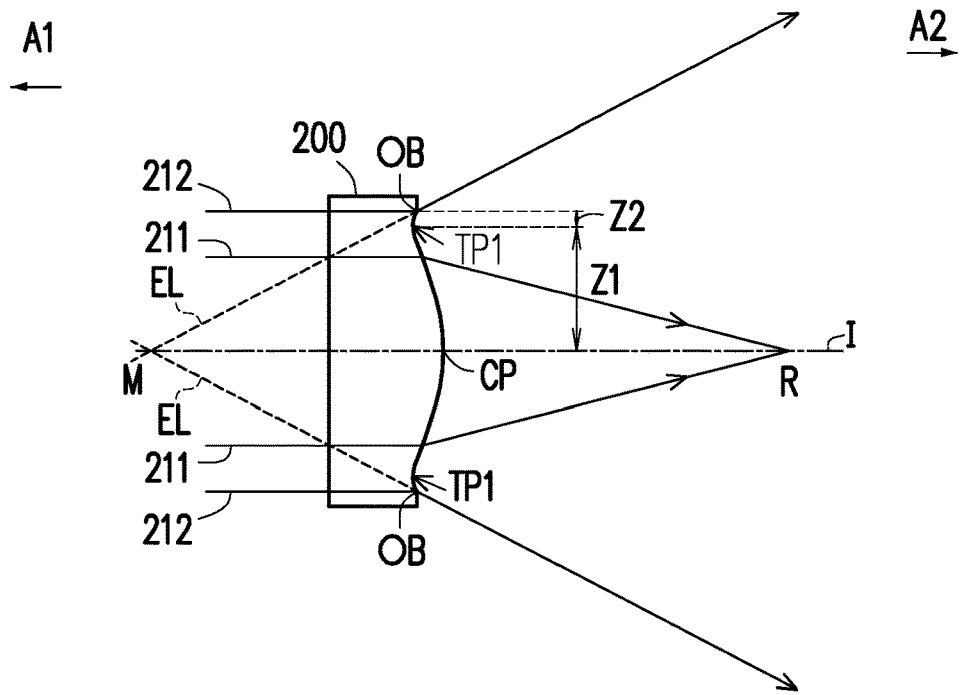
FIG. 2 is a schematic view illustrating the concave-convex surface structure and the ray focus of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
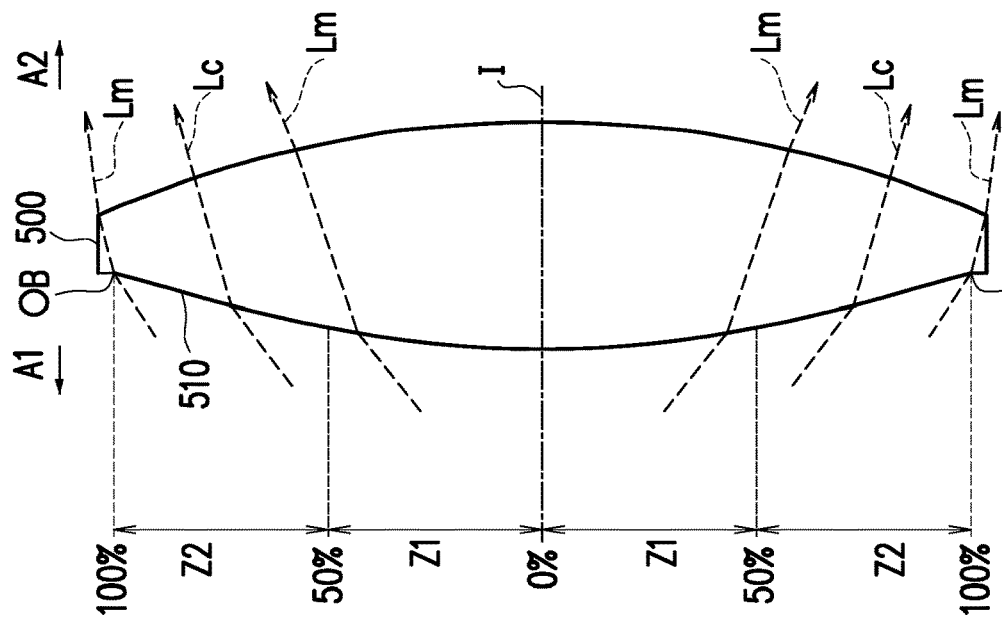
FIG. 5 is a schematic view illustrating the surface structure of a lens element of example 3.
Figure 3:
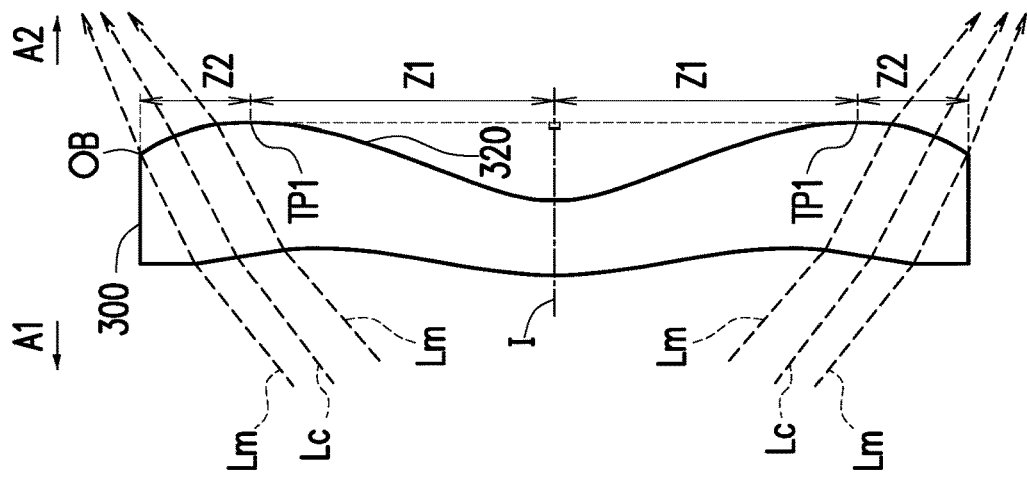
FIG. 3 is a schematic view illustrating the surface structure of a lens element of example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. The lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic view of the optical imaging lens according to a first embodiment of the disclosure, and FIG. 7A to FIG. 7D are diagrams of longitudinal spherical aberration and various aberrations of the optical imaging lens of the first embodiment. Referring first to FIG. 6, an optical imaging lens 10 of the first embodiment of the disclosure includes an aperture 0, a first lens element 1, a second lens element 2, a third lens element 3, a fourth lens element 4, a fifth lens element 5, a sixth lens element 6, a seventh lens element 7, and an eighth lens element 8, and a filter 9 in sequence from the object side A1 to the image side A2 along an optical axis I of the optical imaging lens 10. When the rays emitted by an object to be photographed enters the optical imaging lens 10, it sequentially passes through the aperture 0, the first lens element 1, the second lens element 2, the third lens element 3, the fourth lens element 4, the fifth lens element 5, the sixth lens element 6, the seventh lens element 7, the eighth lens element 8, and the filter 9, and an image is produced on an image plane 99. It is supplemented that the object side A1 is a side facing the object to be photographed, and the image side A2 is a side facing the image plane 99.

In the embodiment, the first lens element 1, the second lens element 2, the third lens element 3, the fourth lens element 4, the fifth lens element 5, the sixth lens element 6, the seventh lens element 7, the eighth lens element 8, and the filter 9 of the optical imaging lens 10 have side surface 15, 25, 35, 45, 55, 65, 75, 85, 95, respectively, facing the object side A1 and allowing the imaging rays to pass through, and image-side surfaces 16, 26, 36, 46, 56, 66, 76, 86, 96, respectively, facing the image side A2 and allowing the imaging rays to pass through. In the embodiment, the aperture 0 is disposed on the object-side surface 15 of the first lens element 1. The filter 9 is disposed between the image-side surface 86 and the image plane 99 of the eighth lens element 8. The filter 9 is an IR cut filter allowing rays of other wavelengths to pass and blocks rays of infrared wavelengths, but the disclosure is not limited to thereto.

The first lens element 1 has positive refracting power. The material of the first lens element 1 is plastic, but the disclosure is not limited thereto. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In the embodiment, both the object-side surface 15 and the image-side surface 16 of the first lens element 1 are aspheric surfaces.

The second lens element 2 has negative refracting power. The material of the second lens element 2 is plastic, but the disclosure is not limited thereto. An optical axis region 251 of the object-side surface 25 of the second lens element 2 is convex, and a periphery region 253 thereof is convex. An optical axis region 262 of the image-side surface 26 of the second lens element 2 is concave, and a periphery region 264 thereof is concave. In the embodiment, both the object-side surface 25 and the image-side surface 26 of the second lens element 2 are aspherical.

The third lens element 3 has negative refracting power. The material of the third lens element 3 is plastic, but the disclosure is not limited thereto. The optical axis region 351 of the object-side surface 35 of the third lens element 3 is convex, and a periphery region 354 thereof is concave. The optical axis region 362 of the image-side surface 36 of the third lens element 3 is concave, and a periphery region 363 thereof is convex. In the embodiment, both the object-side surface 35 and the image-side surface 36 of the third lens element 3 are aspherical.

The fourth lens element 4 has positive refracting power. The material of the fourth lens element 4 is plastic, but the disclosure is not limited thereto. The optical axis region 452 of the object-side surface 45 of the fourth lens element 4 is concave, and the periphery region 453 thereof is convex. The optical axis region 461 of the image-side surface 46 of the fourth lens element 4 is convex, and the periphery region 463 thereof is convex. In the embodiment, both the object-side surface 45 and the image-side surface 46 of the fourth lens element 4 are aspherical.

The fifth lens element 5 has negative refracting power. The material of the fifth lens element 5 is plastic, but the disclosure is not limited thereto. The optical axis region 552 of the object-side surface 55 of the fifth lens element 5 is concave, and the periphery region 554 thereof is concave. The optical axis region 561 of the image-side surface 56 of the fifth lens element 5 is convex, and the periphery region 563 thereof is convex. In the embodiment, both the object-side surface 55 and the image-side surface 56 of the fifth lens element 5 are aspherical.

The sixth lens element 6 has negative refracting power. The material of the sixth lens element 6 is plastic, but the disclosure is not limited thereto. The optical axis region 652 of the object-side surface 65 of the sixth lens element 6 is concave, and the periphery region 654 thereof is concave. The optical axis region 662 of the image-side surface 66 of the sixth lens element 6 is concave, and the periphery region 663 thereof is convex. In the embodiment, both the object-side surface 65 and the image-side surface 66 of the sixth lens element 6 are aspherical.

The seventh lens element 7 has positive refracting power. The material of the seventh lens element 7 is plastic, but the disclosure is not limited thereto. The optical axis region 751 of the object-side surface 75 of the seventh lens element 7 is convex, and the periphery region 754 thereof is concave. The optical axis region 762 of the image-side surface 76 of the seventh lens element 7 is concave, and the periphery region 763 thereof is convex. In the embodiment, both the object-side surface 75 and the image-side surface 76 of the seventh lens element 7 are aspherical.

The eighth lens element 8 has negative refracting power. The material of the eighth lens element 8 is plastic, but the disclosure is not limited thereto. The optical axis region 852 of the object-side surface 85 of the eighth lens element 8 is concave, and the periphery region 853 thereof is convex. The optical axis region 862 of the image-side surface 86 of the eighth lens element 8 is concave, and the periphery region 863 thereof is convex. In the embodiment, both the object-side surface 85 and the image-side surface 86 of the eighth lens element 8 are aspherical.

In the embodiment, the only lens elements of the optical imaging lens 10 are the first lens element 1, the second lens element 2, the third lens element 3, the fourth lens element 4, the fifth lens element 5, the sixth lens element 6, the seventh lens element 7, and the eighth lens element 8, a total of eight pieces.

Other detailed optical data of the first embodiment is shown in FIG. 8. In addition, the effective focal length (EFL) of the optical imaging lens 10 of the first embodiment is 7.863 millimeters (mm), the half field of view (HFOV) is 42.258 degrees, the system length (TTL) is 9.675 mm, the F-number (Fno) is 1.700, the image height (ImgH) is 6.387 mm, and the system length refers to the distance on the optical axis I from the object-side surface 15 of the first lens element 1 to the image plane 99.

In addition, in the embodiment, the object-side surfaces 15, 25, 35, 45, 55, 65, 75, 85 of the first lens element 1, the second lens element 2, the third lens element 3, the fourth lens element 4, the fifth lens element 5, the sixth lens element 6, the seventh lens element 7 and the eighth lens element 8 and the image-side surfaces 16, 26, 36, 46, 56, 66, 76, 86 all have aspheric surfaces. The aspheric surfaces are defined by the formula as follows.

$$Z(Y) = \frac{Y^2}{R}/(1 + \sqrt{1-(1+K)\frac{Y^2}{R^2}}) + \sum_{i=1}^{n} a_i \times Y^i, \quad (1)$$

where

Y is the vertical distance between the point on the aspheric surface and the optical axis I, Z is the depth of the aspheric surface (the vertical distance between the point on the aspheric surface with the distance Y from the optical axis I and the tangent plane to the vertex on the optical axis I of the aspheric surface), R is the radius of curvature of the lens surface near the optical axis I, K is conic constant, $a_i$ is the i-th order aspheric coefficient.

The aspheric coefficients of the object-side surface 15 of the first lens element 1 to the image-side surface 86 of the eighth lens element 8 in formula (1) are shown in FIG. 9. The column number 15 in FIG. 9 represents the aspheric coefficient of the object-side surface 15 of the first lens element 1, and it can be analogically reasoned for the other columns. In addition, the odd-order aspheric coefficients (e.g., $a_1$, $a_3$, $a_5$, $a_7$ . . . and so on) and the second-order aspheric coefficients ($a_2$) that are not listed in the table of FIG. 9 and in the tables of various embodiments are all 0.

In addition, the relationship among the important parameters in the optical imaging lens of the first embodiment is shown in FIG. 30 to FIG. 31. In FIG. 30, the unit of each parameter from the list T1 to the list Tmin and the list ImgH is millimeter (mm), and the unit of each parameter in the list HFOV is degree, where T1 is the thickness of the first lens element 1 on the optical axis I, T2 is the thickness of the second lens element 2 on the optical axis I, T3 is the thickness of the third lens element 3 on the optical axis I, T4 is the thickness of the fourth lens element 4 on the optical axis I, T5 is the thickness of the fifth lens element 5 on the optical axis I, T6 is the thickness of the sixth lens element 6 on the optical axis I, T7 is the thickness of the seventh lens element 7 on the optical axis I, T8 is the thickness of the eighth lens element 8 on the optical axis I, TF is the thickness of the filter 9 on the optical axis I, G12 is the air gap between the first lens element 1 and the second lens element 2 on the optical axis I, and is also the distance from the image-side surface 16 of the first lens element 1 to the object-side surface 25 of the second lens element 2 on the optical axis I, G23 is the air gap between the second lens element 2 and the third lens element 3 on the optical axis I, and is also the distance from the image-side surface 26 of the second lens element 2 to the object-side surface 35 of the third lens element 3 on the optical axis I, G34 is the air gap between the third lens element 3 and the fourth lens element 4 on the optical axis I, and is also the distance from the image-side surface 36 of the third lens element 3 to the object-side surface 45 of the fourth lens element 4 on the optical axis I, G45 is the air gap between the fourth lens element 4 and the fifth lens element 5 on the optical axis I, and is also the distance from the image-side surface 46 of the fourth lens element 4 to the object-side surface 55 of the fifth lens element 5 on the optical axis I, G56 is the air gap between the fifth lens element 5 and the sixth lens element 6 on the optical axis I, and is also the distance from the image-side surface 56 of the fifth lens element 5 to the object-side surface 65 of the sixth lens element 6 on the optical axis I, G67 is the air gap between the sixth lens element 6 and the seventh lens element 7 on the optical axis I, and is also the distance from the image-side surface 66 of the sixth lens element 6 to the object-side surface 75 of the seventh lens element 7 on the optical axis I, G78 is the air gap between the seventh lens element 7 and the eighth lens element 8 on the optical axis I, and is also the distance from the image-side surface 76 of the seventh lens element 7 to the object-side surface 85 of the eighth lens element 8 on the optical axis I, G8F is the air gap between the eighth lens element 8 and the filter 9 on the optical axis I, and is also the distance from the image-side surface 86 of the eighth lens element 8 to the object-side surface 95 of the filter 9 on the optical axis I, GFP is the air gap between the filter 9 and the image plane 99 on the optical axis I, and is also the distance from the image-side surface 96 of the filter 9 to the image plane 99 on the optical axis I, AAG is the sum of the seven air gaps of the first lens element 1 to the eighth lens element 8 on the optical axis I, that is, the sum of G12, G23, G34, G45, G56, G67, and G78, ALT is the total thickness of the eight lens elements of the first lens element 1 to the eighth lens element 8 on the optical axis I, that is, the sum of T1, T2, T3, T4, T5, T6, T7, and T8, Tmax is the maximum thickness of the eight lens elements of the first lens element 1 to the eighth lens element 8 on the optical axis I, that is, the maximum value of T1, T2, T3, T4, T5, T6, T7, and T8, Tmin is the minimum thickness of the eight lens elements of the first lens element 1 to the eighth lens element 8 on the optical axis I, that is, the minimum value of T1, T2, T3, T4, T5, T6, T7, and T8, Tavg is the average thickness of the eight lens elements of the first lens element 1 to the eighth lens element 8 on the optical axis I, that is, the average value of T1, T2, T3, T4, T5, T6, T7, and T8, TL is the distance from the object-side surface 15 of the first lens element 1 to the image-side surface 86 of the eighth lens element 8 on the optical axis I, TTL is the distance from the object-side surface 15 of the first lens element 1 to the image plane 99 on the optical axis I, BFL is the distance from the image-side surface 86 of the eighth lens element 8 to the image plane 99 on the optical axis I, that is, the sum of G8F, TF, and GFP, EFL is the effective focal length of the optical imaging lens 10, HFOV is the half field of view of the optical imaging lens 10, ImgH is the image height of the optical imaging lens 10, and Fno is the F-number of the optical imaging lens 10.

In addition, it is defined that f1 is the focal length of the first lens element 1,
f2 is the focal length of the second lens element 2,
f3 is the focal length of the third lens element 3,
f4 is the focal length of the fourth lens element 4,
f5 is the focal length of the fifth lens element 5,
f6 is the focal length of the sixth lens element 6,
f7 is the focal length of the seventh lens element 7,
f8 is the focal length of the eighth lens element 8,
n1 is the refractive index of the first lens element 1,
n2 is the refractive index of the second lens element 2,
n3 is the refractive index of the third lens element 3,
n4 is the refractive index of the fourth lens element 4,
n5 is the refractive index of the fifth lens element 5,
n6 is the refractive index of the sixth lens element 6,
n7 is the refractive index of the seventh lens element 7,
n8 is the refractive index of the eighth lens element 8,
V1 is the Abbe number of the first lens element 1,
V2 is the Abbe number of the second lens element 2,
V3 is the Abbe number of the third lens element 3,
V4 is the Abbe number of the fourth lens element 4,
V5 is the Abbe number of the fifth lens element 5,
V6 is the Abbe number of the sixth lens element 6,
V7 is the Abbe number of the seventh lens element 7, and
V8 is the Abbe number of the eighth lens element 8.

Referring to FIG. 7A to 7D again, FIG. 7A illustrates the longitudinal spherical aberration of the first embodiment, FIG. 7B and FIG. 7C respectively illustrate the field curvature aberration in the sagittal direction and the field curvature aberration in the tangential direction on the imaging plane 99 of the first embodiment when its wavelength is 470 nanometers (nm), 555 nm and 650 nm, and the FIG. 7D illustrates the distortion aberration on the image plane 99 of the first embodiment when its wavelengths are 470 nm, 555 nm, and 650 nm. In FIG. 7A illustrating the longitudinal spherical aberration of the first embodiment, the curve formed by each wavelength is very close and approaches the middle, indicating that off-axis rays of different heights of each wavelength are concentrated near the imaging point, according to the deflection amplitude of the curve of each wavelength, the deviation of the imaging point of off-axis rays of different heights is controlled within the range of 0.045 mm, and therefore the first embodiment does significantly improve the spherical aberration of the same wavelength. In addition, the distances between the three representative wavelengths are also quite close to one another, meaning that the imaging positions of ray with different wavelengths have been quite concentrated, so that the chromatic aberration has also been significantly improved.

In the two field curvature aberration diagrams of FIG. 7B and FIG. 7C, the field curvature aberrations of the three representative wavelengths in the entire field of view fall within +0.12 mm, indicating that the optical system of the first embodiment can effectively eliminate aberration. The distortion aberration diagram of FIG. 7D illustrates that the distortion aberration of the first embodiment is maintained within the range of +12%, indicating that the distortion aberration of the first embodiment can meet the imaging quality requirements of the optical system. Accordingly, it is explained that compared with the existing optical imaging lens, the optical imaging lens of the first embodiment has the F-number (Fno) of 1.700 and the image height of 6.387 mm, the system length can be shortened to 9.675 mm, and the optical imaging lens may still provide good imaging quality and have good chromatic aberration performance.

FIG. 10 is a schematic view of an optical imaging lens according to a second embodiment of the disclosure, and FIG. 11A to FIG. 11D are longitudinal spherical aberration and various aberration diagrams of the optical imaging lens of the second embodiment. Referring to FIG. 10 first, the second embodiment of the optical imaging lens 10 of the disclosure is substantially similar to the first embodiment, and what differs is illustrated as follows. The parameters of various optical data, aspheric coefficients, and lens elements 1, 2, 3, 4, 5, 6, 7 and 8 are more or less different. In addition, in the embodiment, the third lens element 3 has positive refracting power. Meanwhile, note that for the clarity of the drawing, the reference numerals of the optical axis region and the periphery region similar to those in the first embodiment are omitted in FIG. 10.

The detailed optical data of the optical imaging lens 10 of the second embodiment is shown in FIG. 12. In addition, the effective focal length (EFL) of the optical imaging lens 10 of the second embodiment is 7.755 mm, the half field of view (HFOV) is 42.258 degrees, the system length (TTL) is 9.518 mm, the F-number (Fno) is 1.700, and the image height (ImgH) is 7.013 mm.

As shown in FIG. 13, the aspheric coefficients of the object-side surface 15 of the first lens element 1 to the image-side surface 86 of the eighth lens element 8 in the formula (1) of the second embodiment are illustrated.

In addition, the relationship among the important parameters in the optical imaging lens of the second embodiment is shown in FIG. 30 to FIG. 31.

In FIG. 11A illustrating the longitudinal spherical aberration of the second embodiment, the deviation of the imaging point of off-axis rays of different heights is controlled within a range of 0.08 mm. In the two field curvature aberration diagrams of FIG. 11B and FIG. 11C, the field curvature aberrations of the three representative wavelengths within the entire field of view fall within ±0.25 mm. The distortion aberration diagram of FIG. 11D illustrates that the distortion aberration of the second embodiment is maintained within the range of ±4%. Accordingly, compared with the existing optical imaging lens, the second embodiment has the F-number (Fno) of 1.700 and the image height of 7.013 mm, the system length can be shortened to 9.518 mm, and the optical imaging lens may still provide good imaging quality and have good chromatic aberration performance.

According to the foregoing description, compared with the first embodiment, the second embodiment has advantages as follows. The system length (TTL) of the second embodiment is shorter than that of the first embodiment, the image height (ImgH) of the second embodiment is greater than that of the first embodiment, and the distortion aberration of the second embodiment outperforms that of the first embodiment.

Figure 14:
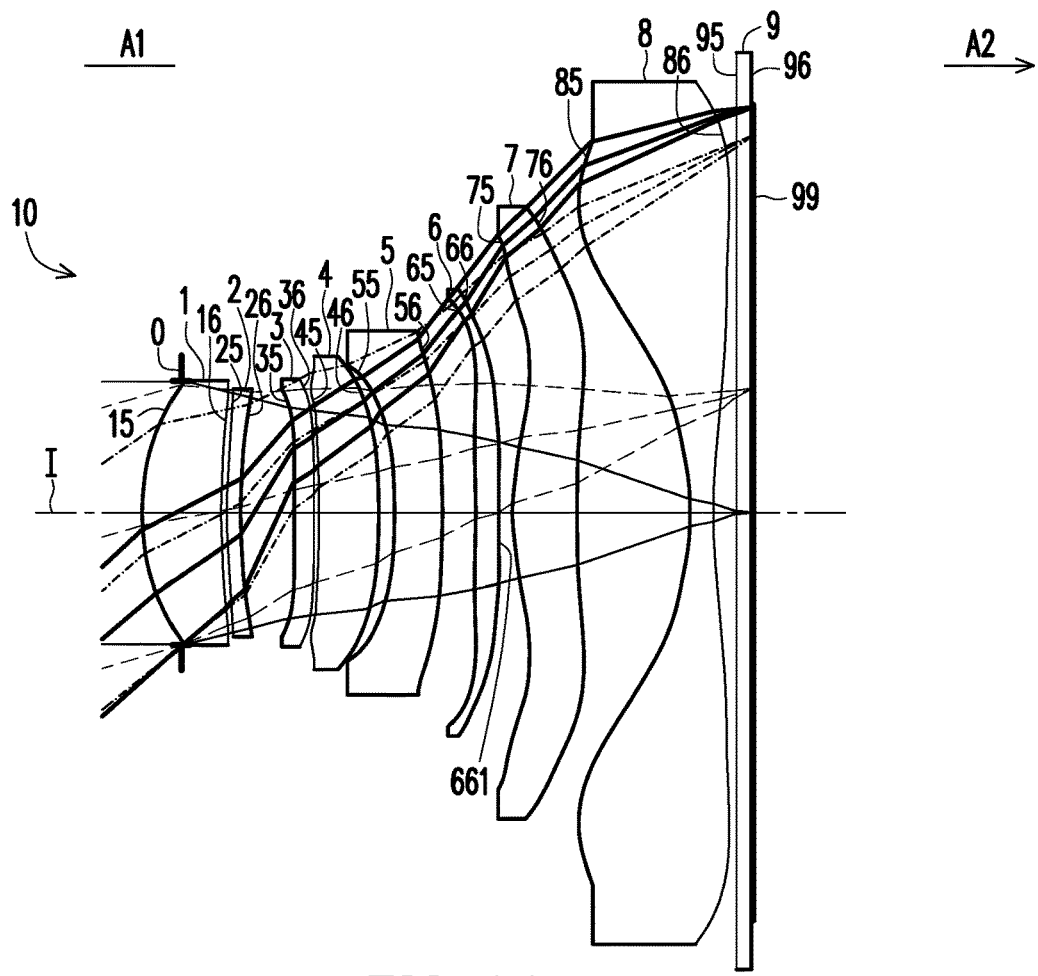
FIG. 14 is a schematic view of an optical imaging lens according to a third embodiment of the disclosure.

FIG. 14 is a schematic view of an optical imaging lens according to a third embodiment of the disclosure, and FIG. 15A to FIG. 15D are diagrams of longitudinal spherical aberration and various aberrations of the optical imaging lens of the third embodiment. Referring to FIG. 14 first, the third embodiment of the optical imaging lens 10 of the disclosure is substantially similar to the first embodiment, and what differs is illustrated as follows. Various optical data, aspheric coefficients, and the parameters of lens elements 1, 2, 3, 4, 5, 6, 7 and 8 are more or less different. In addition, in the embodiment, the second lens element 2 has positive refracting power, and the optical axis region 661 of the image-side surface 66 of the sixth lens element 6 is convex. Note that for the clarity of the drawing, the reference numerals of the optical axis region and the periphery region similar to those in the first embodiment are omitted in FIG. 14.

The detailed optical data of the optical imaging lens 10 of the third embodiment is shown in FIG. 16. In addition, the effective focal length (EFL) of the optical imaging lens 10 of the third embodiment is 5.745 mm, the half field of view (HFOV) is 42.258 degrees, the system length (TTL) is 7.794 mm, the F-number (Fno) is 1.700, and the image height (ImgH) is 5.173 mm.

As shown in FIG. 17, the aspheric coefficients of the object-side surface 15 of the first lens element 1 to the image-side surface 86 of the eighth lens element 8 in the formula (1) of the third embodiment are illustrated.

In addition, the relationship among the important parameters in the optical imaging lens of the third embodiment is shown in FIG. 30 to FIG. 31.

Figures 15A, 15B, 15C, 15D:
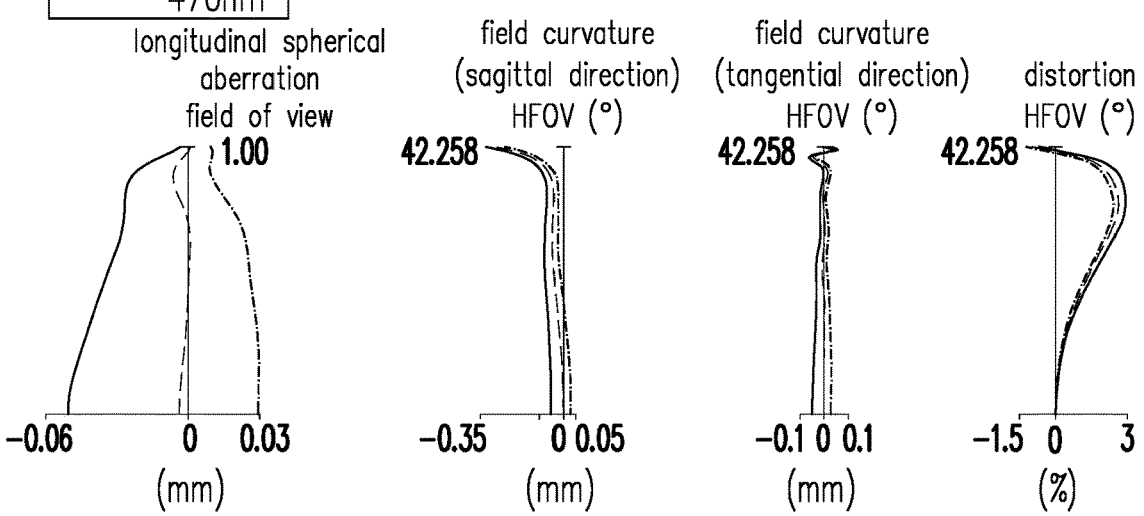
FIG. 15A to FIG. 15D are diagrams of longitudinal spherical aberration and various aberrations of the optical imaging lens of the third embodiment.

In FIG. 15A illustrating the longitudinal spherical aberration of the third embodiment, the deviation of the imaging point of off-axis rays of different heights is controlled within a range of ±0.06 mm. In the two field curvature aberration diagrams of FIG. 15B and FIG. 15C, the field curvature aberrations of the three representative wavelengths within the entire field of view fall within ±0.35 mm. The distortion aberration diagram of FIG. 15D illustrates that the distortion aberration of the third embodiment is maintained within the range of ±3%. Accordingly, compared with the existing optical imaging lens, the third embodiment has the F-number (Fno) of 1.700 and the image height of 5.173 mm, the system length can be shortened to 7.794 mm, and the optical imaging lens may still provide good imaging quality and chromatic aberration performance.

According to the forgoing description, compared with the first embodiment, the third embodiment has advantages as follows. The system length (TTL) of the third embodiment is shorter than that of the first embodiment, and the distortion aberration of the third embodiment outperforms that of the first embodiment.

FIG. 18 is a schematic view of an optical imaging lens according to a fourth embodiment of the disclosure, and FIG. 19A to FIG. 19D are diagrams of longitudinal spherical aberration and various aberrations of the optical imaging lens of the fourth embodiment. Referring to FIG. 18 first, the fourth embodiment of the optical imaging lens 10 of the disclosure is substantially similar to the first embodiment, and what differs is illustrated as follows. Various optical data, aspheric coefficients, and the parameters of the lens elements 1, 2, 3, 4, 5, 6, 7, 8 are more or less different. In addition, in the embodiment, the third lens element 3 has positive refracting power. Meanwhile, note that for the clarity of the drawing, the reference numerals of the optical axis region and the periphery region similar to those in the first embodiment are omitted in FIG. 18.

The detailed optical data of the optical imaging lens 10 of the fourth embodiment is shown in FIG. 20. In addition, the effective focal length (EFL) of the optical imaging lens 10 of the fourth embodiment is 7.466 mm, and the half field of view (HFOV) is 41.773 degrees, the system length (TTL) is 9.316 mm, the F-number (Fno) is 1.700, and the image height (ImgH) is 7.153 mm.

As shown in FIG. 21, the aspheric coefficients of the object-side surface 15 of the first lens element 1 to the image-side surface 86 of the eighth lens element 8 in the formula (1) of the fourth embodiment are illustrated.

In addition, the relationship among the important parameters in the optical imaging lens of the fourth embodiment is shown in FIG. 30 to FIG. 31.

In FIG. 19A illustrating the longitudinal spherical aberration of the fourth embodiment, the deviation of the imaging point of off-axis rays of different heights is controlled within a range of 0.025 mm. In the two field curvature aberration diagrams of FIG. 19B and FIG. 19C, the field curvature aberrations of the three representative wavelengths within the entire field of view fall within ±0.07 mm. The distortion aberration diagram of FIG. 19D illustrates that the distortion aberration of the fourth embodiment is maintained within the range of +8%. Accordingly, compared with the existing optical imaging lens, the fourth embodiment has the F-number (Fno) of 1.700 and the image height of 7.153 mm, the system length can be shortened to 9.316 mm, and the optical imaging lens may still provide good imaging quality and have good chromatic aberration performance.

According to the foregoing description, compared with the first embodiment, the fourth embodiment has advantages as follows. The system length (TTL) of the fourth embodiment is shorter than that of the first embodiment, the image height (ImgH) of the fourth embodiment is greater than that of the first embodiment, and the longitudinal spherical aberration, the field curvature aberration, and the distortion aberration of the fourth embodiment outperform those of the first embodiment.

Figure 22:
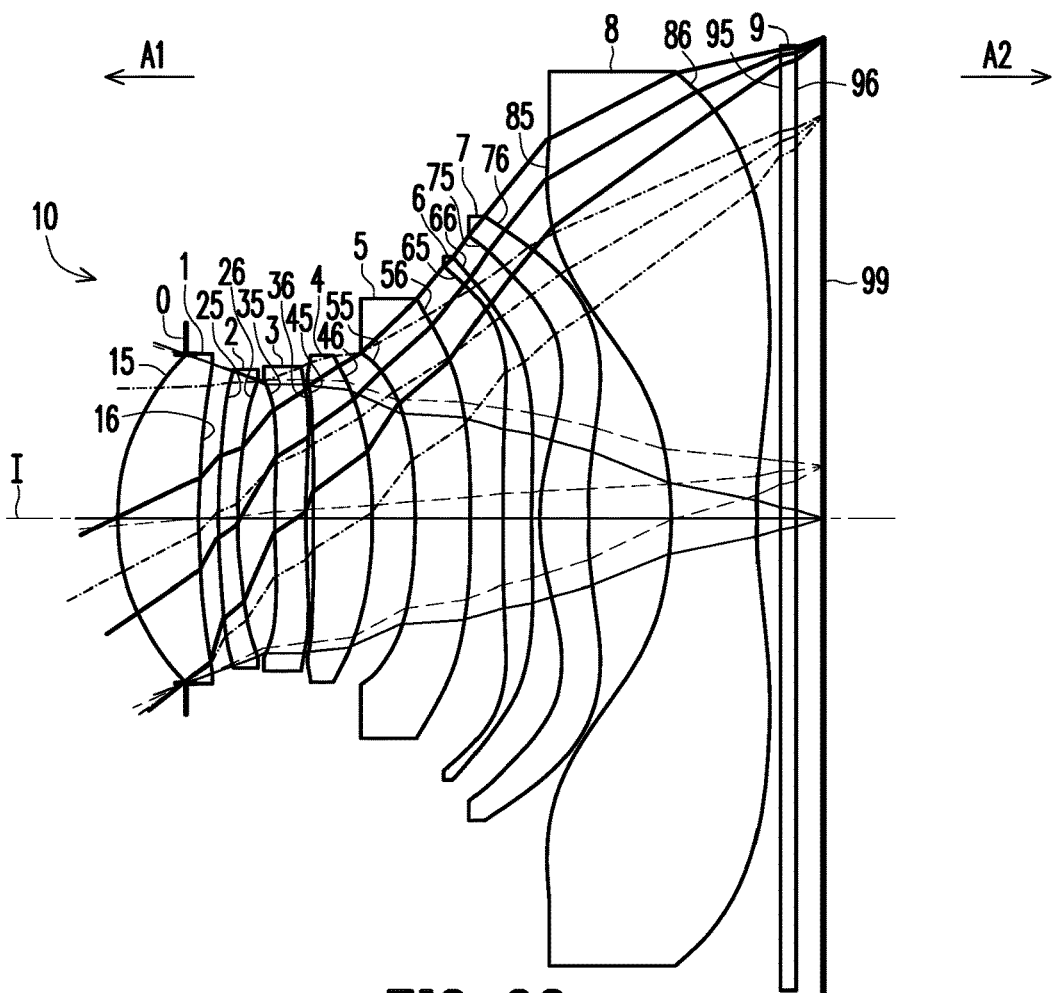
FIG. 22 is a schematic view of an optical imaging lens according to a fifth embodiment of the disclosure.

FIG. 22 is a schematic view of an optical imaging lens according to a fifth embodiment of the disclosure, and FIG. 23A to FIG. 23D are diagrams of longitudinal spherical aberration and various aberrations of the optical imaging lens of the fifth embodiment. Referring to FIG. 22 first, the fifth embodiment of the optical imaging lens 10 of the disclosure is substantially similar to the first embodiment, and what differs is illustrated as follows. Various optical data, aspheric coefficients, and the parameters of the lens elements 1, 2, 3, 4, 5, 6, 7 and 8 are more or less different. Meanwhile, note that for the clarity of the drawing, the reference numerals of the optical axis region and the periphery region similar to those in the first embodiment are omitted in FIG. 22.

The detailed optical data of the optical imaging lens 10 of the fifth embodiment is shown in FIG. 24. In addition, the effective focal length (EFL) of the optical imaging lens 10 of the fifth embodiment is 7.628 mm, the half field of view (HFOV) is 43.012 degrees, the system length (TTL) is 9.520 mm, the F-number (Fno) is 1.700, and the image height (ImgH) is 6.528 mm.

As shown in FIG. 25, the aspheric coefficients of the object-side surface 15 of the first lens element 1 to the image-side surface 86 of the eighth lens element 8 in the formula (1) of the fifth embodiment are illustrated.

In addition, the relationship among the important parameters in the optical imaging lens of the fifth embodiment is shown in FIG. 30 to FIG. 31.

Figure 23A:
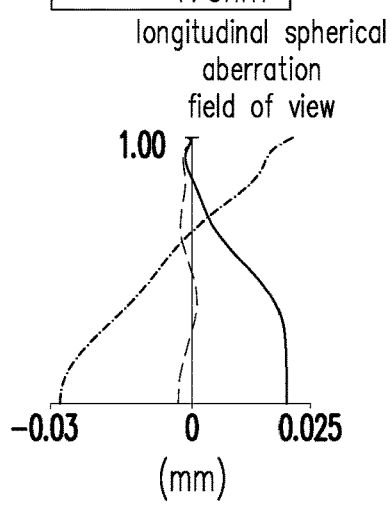
FIG. 23A to FIG. 23D are diagrams of longitudinal spherical aberration and various aberrations of the optical imaging lens of the fifth embodiment.
Figure 23B:
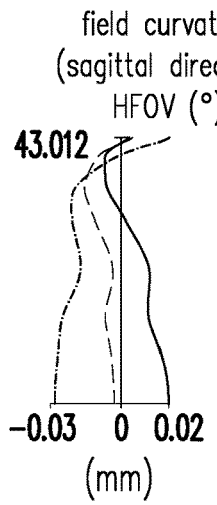
Figure 23C:
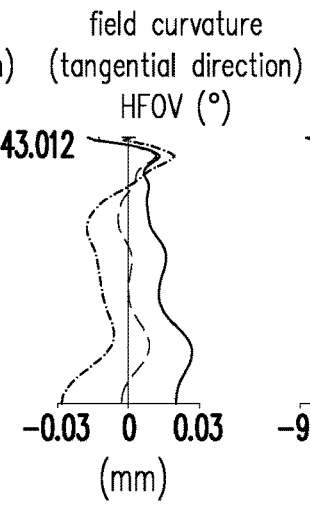
Figure 23D:
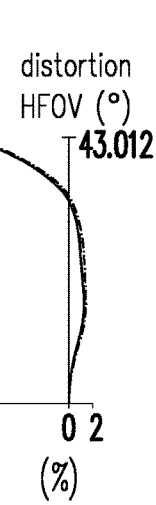

In FIG. 23A illustrating the longitudinal spherical aberration of the fifth embodiment, the deviation of the imaging point of off-axis rays of different heights is controlled within a range of 0.03 mm. In the two field curvature aberration diagrams of FIG. 23B and FIG. 23C, the field curvature aberrations of the three representative wavelengths within the entire field of view fall within ±0.03 mm. The distortion aberration diagram of FIG. 23D illustrates that the distortion aberration of the fifth embodiment is maintained within the range of ±9%. Accordingly, compared with the existing optical imaging lens, the fifth embodiment has the F-number (Fno) of 1.700 and the image height of 6.528 mm, the system length can be shortened to 9.520 mm, and the optical imaging lens may still provide good imaging quality and have good chromatic aberration performance.

According to the foregoing description, compared with the first embodiment, the fifth embodiment has advantages as follows. The system length (TTL) of the fifth embodiment is shorter than that of the first embodiment, the half field of view (HFOV) of the fifth embodiment is greater than that of the first embodiment, the image height (ImgH) of the fifth embodiment is greater than that of the first embodiment, and the longitudinal spherical aberration, the field curvature aberration, and the distortion aberration of the fifth embodiment outperform those of the first embodiment.

Figure 26:
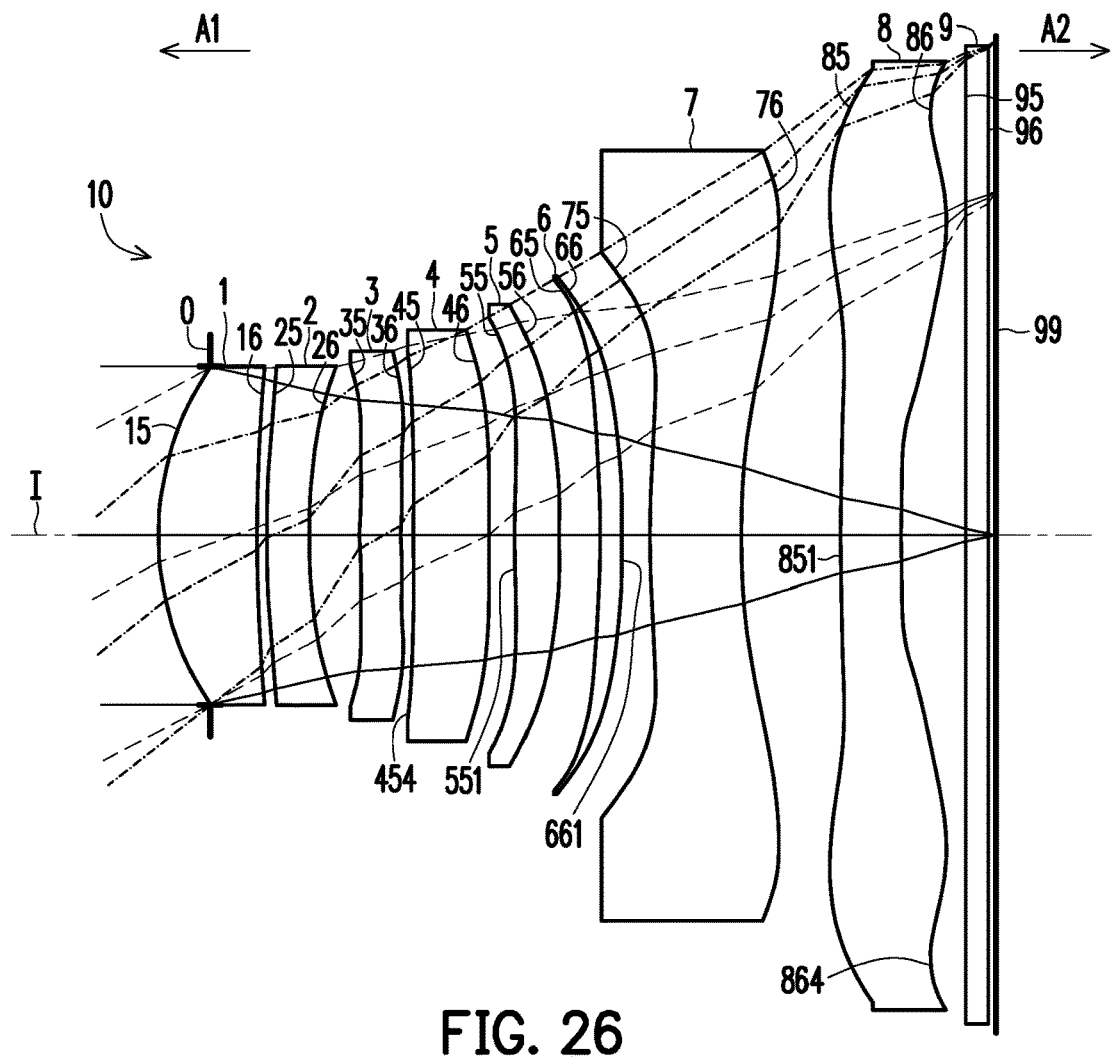
FIG. 26 is a schematic view of an optical imaging lens according to a sixth embodiment of the disclosure.

FIG. 26 is a schematic view of an optical imaging lens according to a sixth embodiment of the disclosure, and FIG. 27A to FIG. 27D are diagrams of longitudinal spherical aberration and various aberrations of the optical imaging lens of the sixth embodiment. Referring to FIG. 26 first, the sixth embodiment of the optical imaging lens 10 of the disclosure is substantially similar to the first embodiment, and what differs is illustrated as follows. Various optical data, aspheric coefficients, and the parameters of the lens elements 1, 2, 3, 4, 5, 6, 7 and 8 are more or less different. In addition, in the embodiment, the fourth lens element 4 has negative refracting power, the fifth lens element 5 has positive refracting power, the seventh lens element 7 has negative refracting power, and the eighth lens element 8 has positive refracting power; in addition, the periphery region 454 of the object-side surface 45 of the fourth lens element 4 is concave, the optical axis region 551 of the object-side surface 55 of the fifth lens element 5 is convex, the optical axis region 661 of the image-side surface 66 of the sixth lens element 6 is convex, the optical axis region 851 of the object-side surface 85 of the eight lens element 8 is convex, and the periphery region 864 of the image-side surface 86 of the eighth lens element 8 is concave. Meanwhile, note that for the clarity of the drawing, the reference numerals of the optical axis region and the periphery region similar to those in the first embodiment are omitted in FIG. 26.

The detailed optical data of the optical imaging lens 10 of the sixth embodiment is shown in FIG. 28. In addition, the effective focal length (EFL) of the optical imaging lens 10 of the sixth embodiment is 5.610 mm, the half field of view (HFOV) is 39.156 degrees, the system length (TTL) is 8.022 mm, the F-number (Fno) is 1.700, and the image height (ImgH) is 4.800 mm.

As shown in FIG. 29, the aspheric coefficients of the object-side surface 15 of the first lens element 1 to the image-side surface 86 of the eighth lens element 8 in the formula (1) of the sixth embodiment are illustrated.

In addition, the relationship among the important parameters in the optical imaging lens of the sixth embodiment is shown in FIG. 30 to FIG. 31.

Figure 27A:
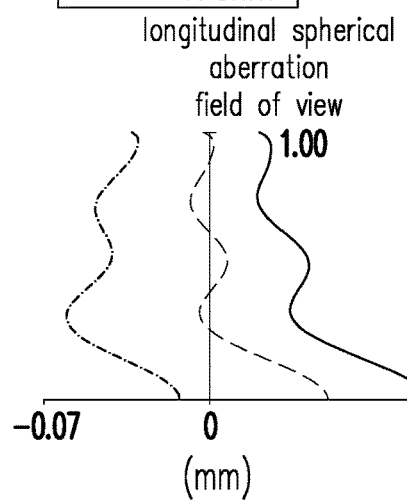
FIG. 27A to FIG. 27D are diagrams of longitudinal spherical aberration and various aberrations of the optical imaging lens of the sixth embodiment.
Figure 27B:
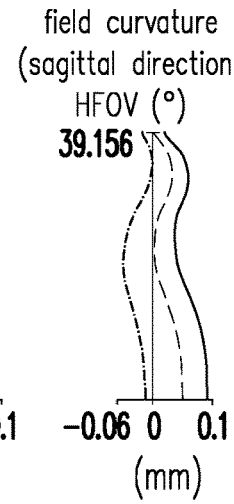
Figures 27C, 27D:
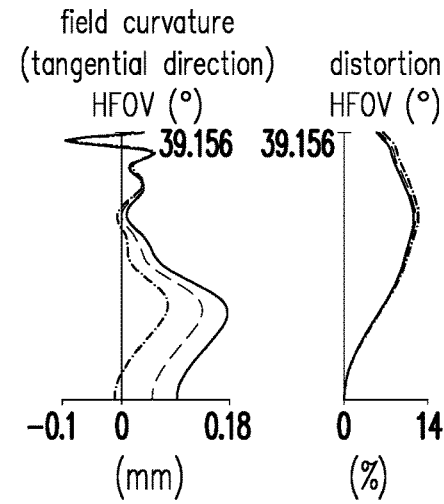

In FIG. 27A illustrating the longitudinal spherical aberration of the sixth embodiment, the deviation of the imaging point of off-axis rays of different heights is controlled within a range of 0.1 mm. In the two field curvature aberration diagrams of FIG. 27B and FIG. 27C, the field curvature aberrations of the three representative wavelengths within the entire field of view fall within +0.18 mm. The distortion aberration diagram of FIG. 27D illustrates that the distortion aberration of the sixth embodiment is maintained within the range of +14%. Accordingly, compared with the existing optical imaging lens, the sixth embodiment has the F-number (Fno) of 1.700 and the image height of 4.800 mm, the system length can be shortened to 8.022 mm, and the optical imaging lens may still provide good imaging quality and have good chromatic aberration performance.

According to the foregoing description, compared with the first embodiment, the sixth embodiment has advantages as follows. The system length (TTL) of the sixth embodiment is shorter than that of the first embodiment, and the thickness difference between the optical axis and the periphery region of the sixth embodiment is less than that of the first embodiment, which facilitates the manufacturing process and therefore there is a higher yield.

The numerical control of the optical properties and parameters of the following lens elements can assist designers in designing technically feasible optical imaging lenses with small F-number (Fno), large image height, good optical performance, and improved chromatic aberration.

In the embodiment of the disclosure, when the first lens element has positive refracting power and the optical axis region of the image-side surface of the first lens element is concave, the periphery region of the object-side surface of the second lens element is convex, and the periphery region of the image-side surface of the third lens element is convex, which can gather rays from a large angle, the optical axis region of the image-side surface of the fifth lens element is convex, the sixth lens element has negative refracting power, and the periphery region of the object-side surface of the eighth lens element is convex, the aberration caused by the first lens element to the third lens element can be corrected, so that the optical imaging lens has good imaging quality; when the material of the lens element is further controlled to meet the condition V3+V5+V7≤120.000, the chromatic aberration can be effectively improved and the resolution of the lens can be improved. The preferred range of V3+V5+V7 is 70.000≤V3+V5+V7≤120.000.

In the embodiment of the disclosure, when the first lens element has positive refracting power, the optical axis region of the image-side surface of the first lens element is concave, and the periphery region of the image-side surface of the third lens element is convex, which can gather rays form a large angle, the optical axis region of the image-side surface of the fifth lens element is convex, the sixth lens element has negative refracting power, the periphery region of the object-side surface of the seventh lens element is concave, and the periphery region of the object-side surface of the eighth lens element is convex, the aberration and distortion caused by the first lens element to the third lens element at the edge of the image plane can be corrected, so that the optical imaging lens has a good imaging quality; when the material of the lens element is further controlled to meet the condition V3+V5+V7≤120.000, the chromatic aberration can be effectively improved, and the resolution of the lens can be improved. The preferred range of V3+V5+V7 is 70.000 c V3+V5+V7≤120.000.

In the embodiment of the disclosure, when the first lens element has positive refracting power, the optical axis region of the image-side surface of the first lens element is concave, and the periphery region of the image-side surface of the third lens element is convex, which can gather rays from a large angle, the optical axis region of the image-side surface of the fifth lens element is convex, the sixth lens element has negative refracting power, the periphery region of the object-side surface of the eighth lens element is convex, and the optical axis region of the image-side surface of the eighth lens element is concave, the aberrations and distortions caused by the first lens element to the third lens element can be corrected, which contributes to the imaging rays being clearly focused on the image plane; when the material of the lens element is further controlled to meet the condition V3+V5+V7≤120.000, the chromatic aberration can be effectively improved, and the resolution of the lens can be improved. The preferred range of V3+V5+V7 is 70.000 c V3+V5+V7≤120.000.

In the embodiment of the disclosure, the system image height can be effectively increased, the F-number (Fno) can be reduced, and the photosensitive effect of the imaging lens can be increased when the image height (ImgH) of the optical imaging lens meets the following relationship:

ImgH/(BFL+Tmax)≥2.550, preferably 2.550≤ImgH/(BFL+Tmax)≤4.200;

(EFL+ImgH)/(Tmax+Tmin)≥8.800, preferably 8.800≤(EF+ImgH)/(Tmax+Tmin)≤11.000.

In order to shorten the system length and ensure the image quality, as well as considering the difficulty of production, reducing the air gap between the lens elements or reducing the thickness of the lens elements appropriately is adopted as a means. If the numerical limit of the following conditions is satisfied, the embodiment of the disclosure can have a favorable configuration and meets the preferred range, and the aberration and distortion of the optical imaging lens can be improved.

(TTL+Tmin)/Tmax≤8.800, preferably 6.900≤(TTL+Tmin)/Tmax≤8.800;

(T2+T5)/T3≥2.100, preferably 2.100≤(T2+T5)/T3≤3.400;

TL/(G67+G78)≤7.000, preferably 4.000≤TL/(G67+G78)≤7.000;

ALT/(G56+T7)≤000, preferably 3.200≤ALT/(G56+T7)≤5.000;

AAG/(T1+T8)≤2.200, preferably 1.200≤AAG/(T1+T8)≤2.200;

(T4+G45+T5+T8)/BFL≥2.000, preferably 2.000≤(T4+G45+T5+T8)/BFL≤4.800;

(T1+T7)/T4≥2.100, preferably 2.100≤(T1+T7)/T4≤3.000;

TL/(G12+BFL)≥6.500, preferably 6.500≤TL/(G12+BFL)≤16.900;

ALT/(G45+G67+G78)≤3.500, preferably 2.100≤ALT/(G45+G67+G78)≤3.500;

AAG/(T2+T6+T7)≤2.400, preferably 1.450AAG/(T2+T6+T7)≤2.400;

TTL/(T1+G23)≤6.100, preferably 4.100≤TTL/(T1+G23)≤6.100;

(G78+T8)/(G12+T2)≥3.000, preferably 3.000≤(G78+T8)/(G12+T2)≤8.800;

TL/(G45+G56)≤12.550, preferably 7.600≤TL/(G45+G56)≤12.550;

BFL/(G23+G34)≤1.550, preferably 0.560≤BFL/(G23+G34)≤1.550;

EFL/(T3+T6)≥7.500, preferably 7.500≤EFL/(T3+T6)≤11.300.

In addition, any combination of the embodiment parameters can be selected to increase the lens limit, so as to facilitate the lens design of the same architecture of the disclosure.

In view of the unpredictability of the optical system design, under the architecture of the disclosure, when the conditions are met, the disclosure may favorably reduce the F-number (Fno), increase the image height, improve the chromatic aberration, and improve the image quality, or increase the assembly yield rate, thereby improving the defects of the previous technology. The use of plastic material for the lens elements of the embodiments of the disclosure can further reduce the lens weight and the cost.

The numerical range including the maximum and minimum values obtained from the combination ratio relationship of the optical parameters disclosed in the various embodiments of the disclosure can be implemented accordingly.

The contents in the embodiments of the disclosure include but are not limited to a focal length, a thickness of a lens element, an Abbe number, or other optical parameters. For example, in the embodiments of the disclosure, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$; $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the disclosure. The aforementioned description is for exemplary explanation, but the disclosure is not limited thereto.

The embodiments of the disclosure are all implementable. In addition, a combination of partial features in a same embodiment can be selected, and the combination of partial features can achieve the unexpected result of the disclosure with respect to the prior art. The combination of partial features includes but is not limited to the surface shape of a lens element, a refracting power, a conditional expression or the like, or a combination thereof. The description of the embodiments is for explaining the specific embodiments of the principles of the disclosure, but the disclosure is not limited thereto. Specifically, the embodiments and the drawings are for exemplifying, but the disclosure is not limited thereto.

What is claimed is:

1. An optical imaging lens, comprising a first lens element, a second lens element, a third lens element, a fourth lens element, a fifth lens element, a sixth lens element, a seventh lens element, and an eighth lens element in sequence along an optical axis from an object side to an image side, wherein the first lens element to the eighth lens element each comprise an object-side surface facing the object side and allowing imaging rays to pass through and an image-side surface facing the image side and allowing the imaging rays to pass through;

the first lens element has positive refracting power and an optical axis region of the image-side surface of the first lens element is concave;
a periphery region of the object-side surface of the second lens element is convex;
a periphery region of the image-side surface of the third lens element is convex;
an optical axis region of the image-side surface of the fifth lens element is convex;
the sixth lens element has negative refracting power;
an optical axis region of an image-side surface of the seventh lens element is concave;
a periphery region of the object-side surface of the eighth lens element is convex;
wherein the optical imaging lens has only the eight lens elements, and the optical imaging lens satisfies the following condition:

$V3+V5+V7 \leq 120.000$;

where V3 is an Abbe number of the third lens element, V5 is an Abbe number of the fifth lens element, and V7 is an Abbe number of the seventh lens element.

2. The optical imaging lens according to claim 1, wherein the optical imaging lens satisfies $(T2+T5)/T3 \geq 2.100$, where T2 is a thickness of the second lens element on the optical axis, T3 is a thickness of the third lens element on the optical axis, and T5 is a thickness of the fifth lens element on the optical axis.

3. The optical imaging lens according to claim 1, wherein the optical imaging lens further satisfies $TL/(G67+G78) \leq 7.000$, where TL is a distance from the object-side surface of the first lens element to the image-side surface of the eighth lens element on the optical axis, G67 is an air gap between the sixth lens element and the seventh lens element on the optical axis, and G78 is an air gap between the seventh lens element and the eighth lens element on the optical axis.

4. The optical imaging lens according to claim 1, wherein the optical imaging lens further satisfies $ImgH/(BFL+Tmax) \geq 2.550$, where ImgH is an image height of the optical imaging lens, BFL is a distance from the image-side surface of the eighth lens element to an image plane on the optical axis, and Tmax is a maximum thickness of the eight lens elements of the first lens element to the eighth lens element on the optical axis.

5. The optical imaging lens according to claim 1, wherein the optical imaging lens further satisfies $ALT/(G56+T7) \leq 5.000$, where ALT is a total thickness of the eight lens elements from the first lens element to the eighth lens element on the optical axis, G56 is an air gap between the fifth lens element and the sixth lens element on the optical axis, and T7 is a thickness of the seventh lens element on the optical axis.

6. The optical imaging lens according to claim 1, wherein the optical imaging lens further satisfies $AAG/(T1+T8) \leq 2.200$, where AAG is the sum of seven air gaps from the first lens element to the eighth lens element on the optical axis, T1 is a thickness of the first lens element on the optical axis, and T8 is a thickness of the eighth lens element on the optical axis.

7. The optical imaging lens according to claim 1, wherein the optical imaging lens further satisfies $(T4+G45+T5+T8)/BFL \geq 2.000$, where T4 is a thickness of the fourth lens element on the optical axis, T5 is a thickness of the fifth lens element on the optical axis, T8 is a thickness of the eighth lens element on the optical axis, G45 is an air gap between the fourth lens element and the fifth lens element on the optical axis, and BFL is a distance from the image-side surface of the eighth lens element to an image plane on the optical axis.

8. An optical imaging lens, comprising a first lens element, a second lens element, a third lens element, a fourth lens element, a fifth lens element, a sixth lens element, a seventh lens element, and an eighth lens element in sequence along an optical axis from an object side to an image side, wherein the first lens element to the eighth lens element each comprise an object-side surface facing the object side and allowing imaging rays to pass through and an image-side surface facing the image side and allowing the imaging rays to pass through;

the first lens element has positive refracting power and an optical axis region of the image-side surface of the first lens element is concave;
a periphery region of the image-side surface of the third lens element is convex;
an optical axis region of the image-side surface of the fifth lens element is convex;
the sixth lens element has negative refracting power;
a periphery region of an object-side surface of the seventh lens element is concave;
an optical axis region of an image-side surface of the seventh lens element is concave;
a periphery region of the object-side surface of the eighth lens element is convex;
wherein the optical imaging lens has only the eight lens elements, and the optical imaging lens satisfies the following condition:

$V3+V5+V7 \leq 120.000$;

where V3 is an Abbe number of the third lens element, V5 is an Abbe number of the fifth lens element, and V7 is an Abbe number of the seventh lens element.

9. The optical imaging lens according to claim 8, wherein the optical imaging lens further satisfies $(T1+T7)/T4 \geq 2.100$, where T1 is a thickness of the first lens element on the optical axis, T4 is a thickness of the fourth lens element on the optical axis, and T7 is a thickness of the seventh lens element on the optical axis.

10. The optical imaging lens according to claim 8, wherein the optical imaging lens further satisfies $TL/(G12+BFL) \geq 6.500$, where TL is a distance from the object-side surface of the first lens element to the image-side surface of the eighth lens element on the optical axis, G12 is an air gap between the first lens element and the second lens element on the optical axis, and BFL is a distance from the image-side surface of the eighth lens element to an image plane on the optical axis.

11. The optical imaging lens according to claim 8, wherein the optical imaging lens further satisfies (EFL+ImgH)/(Tmax+Tmin)≥8.800, where EFL is an effective focal length of the optical imaging lens, ImgH is an image height of the optical imaging lens, Tmax is a maximum thickness of the eight lens elements of the first lens element to the eighth lens element on the optical axis, and Tmin is a minimum thickness of the eight lens elements of the first lens element to the eighth lens element on the optical axis.

12. The optical imaging lens according to claim 8, wherein the optical imaging lens further satisfies ALT/(G45+G67+G78)≤3.500, where ALT is a total thickness of the eight lens elements from the first lens element to the eighth lens element on the optical axis, G45 is an air gap between the fourth lens element and the fifth lens element on the optical axis, G67 is an air gap between the sixth lens element and the seventh lens element on the optical axis, and G78 is an air gap between the seventh lens element and the eighth lens element on the optical axis.

13. The optical imaging lens according to claim 8, wherein the optical imaging lens further satisfies AAG/(T2+T6+T7)≤2.400, where AAG is a sum of seven air gaps from the first lens element to the eighth lens element on the optical axis, T2 is a thickness of the second lens element on the optical axis, T6 is a thickness of the sixth lens element on the optical axis, and T7 is a thickness of the seventh lens element on the optical axis.

14. The optical imaging lens according to claim 8, wherein the optical imaging lens further satisfies TTL/(T1+G23)≤6.100, where TTL is a distance from the object-side surface of the first lens element to an image plane on the optical axis, T1 is a thickness of the first lens element on the optical axis, and G23 is an air gap between the second lens element and the third lens element on the optical axis.

15. An optical imaging lens, comprising a first lens element, a second lens element, a third lens element, a fourth lens element, a fifth lens element, a sixth lens element, a seventh lens element, and an eighth lens element in sequence along an optical axis from an object side to an image side, wherein the first lens element to the eighth lens element each comprise an object-side surface facing the object side and allowing imaging rays to pass through and an image-side surface facing the image side and allowing the imaging rays to pass through;

the first lens element has positive refracting power and an optical axis region of the image-side surface of the first lens element is concave;
a periphery region of the image-side surface of the third lens element is convex;
an optical axis region of the image-side surface of the fifth lens element is convex;
the sixth lens element has negative refracting power;
an optical axis region of an image-side surface of the seventh lens element is concave;
a periphery region of the object-side surface of the eighth lens element is convex, and an optical axis region of the image-side surface of the eighth lens element is concave;
wherein the optical imaging lens has only the eight lens elements, and the optical imaging lens satisfies the following condition:

$V3+V5+V7 \leq 120.000$;

where V3 is an Abbe number of the third lens element, V5 is an Abbe number of the fifth lens element, and V7 is an Abbe number of the seventh lens element.

16. The optical imaging lens according to claim 15, wherein the optical imaging lens further satisfies (G78+T8)/(G12+T2)≥3.000, where T2 is a thickness of the second lens element on the optical axis, T8 is a thickness of the eighth lens element on the optical axis, G12 is an air gap between the first lens element and the second lens element on the optical axis, and G78 is an air gap between the seventh lens element and the eighth lens element on the optical axis.

17. The optical imaging lens according to claim 15, wherein the optical imaging lens further satisfies TL/(G45+G56)≤12.550, where TL is a distance from the object-side surface of the first lens element to the image-side surface of the eighth lens element on the optical axis, G45 is an air gap between the fourth lens element and the fifth lens element on the optical axis, and G56 is an air gap between the fifth lens element and the sixth lens element on the optical axis.

18. The optical imaging lens according to claim 15, wherein the optical imaging lens further satisfies (TTL+Tmin)/Tmax≤8.800, where TTL is a distance from the object-side surface of the first lens element to an image plane on the optical axis, Tmin is a minimum thickness of the eight lens elements from the first lens element to the eighth lens element on the optical axis, and Tmax is a maximum thickness of the eight lens elements of the first lens element to the eighth lens element on the optical axis.

19. The optical imaging lens according to claim 15, wherein the optical imaging lens further satisfies BFL/(G23+G34)≤1.550, where BFL is a distance from the image-side surface of the eighth lens element to an image plane on the optical axis, G23 is an air gap between the second lens element and the third lens element on the optical axis, and G34 is an air gap between the third lens element and the fourth lens element on the optical axis.

20. The optical imaging lens according to claim 15, wherein the optical imaging lens further satisfies EFL/(T3+T6)=7.500, where EFL is an effective focal length of the optical imaging lens, T3 is a thickness of the third lens element on the optical axis, and T6 is a thickness of the sixth lens element on the optical axis.

* * * * *